United States Patent [19]

Kusui et al.

[11] Patent Number: 5,742,508
[45] Date of Patent: Apr. 21, 1998

[54] AIR CONTROL SUPPORTING SYSTEM

[75] Inventors: Yoichi Kusui, Fujisawa; Tatsuro Ito, Kawasaki, both of Japan

[73] Assignee: Kabushiki Kaisha Toshiba, Kawasaki, Japan

[21] Appl. No.: 781,923

[22] Filed: Dec. 30, 1996

Related U.S. Application Data

[63] Continuation of Ser. No. 444,278, May 18, 1995, abandoned.

[30] Foreign Application Priority Data

May 18, 1994 [JP] Japan .................... 6-104195

[51] Int. Cl.⁶ .................................... G06F 15/48
[52] U.S. Cl. ............... 364/439; 395/500; 395/670; 395/676; 395/200.01; 395/200.03; 342/36; 73/178 T
[58] Field of Search ................... 395/500, 206, 395/201, 670, 676, 677, 331, 200.03, 200.01; 364/439, 449.3, 449.4, 260, DIG. 1, 428; 340/990, 988; 342/36; 73/178 T

[56] References Cited

U.S. PATENT DOCUMENTS

| | | | |
|---|---|---|---|
| 4,714,995 | 12/1987 | Materna et al. | 395/600 |
| 4,769,762 | 9/1988 | Tsujido | 364/521 |
| 4,890,232 | 12/1989 | Mundra | 364/439 |
| 4,975,696 | 12/1990 | Salter, Jr et al. | 340/973 |
| 4,979,137 | 12/1990 | Gerstenfeld et al. | 364/578 |
| 5,025,382 | 6/1991 | Artz | 364/439 |
| 5,029,183 | 7/1991 | Tymes | 375/1 |
| 5,179,329 | 1/1993 | Nishikawa et al. | 318/587 |
| 5,185,857 | 2/1993 | Rozmanith et al. | 395/148 |
| 5,200,902 | 4/1993 | Pilley | 364/439 |
| 5,235,513 | 8/1993 | Velger et al. | 364/449 |
| 5,247,575 | 9/1993 | Sprague et al. | 380/9 |
| 5,343,395 | 8/1994 | Watts | 364/428 |

FOREIGN PATENT DOCUMENTS 2 211 642 7/1989 United Kingdom.

*Primary Examiner*—Kevin J. Teska
*Assistant Examiner*—Thai Phan
*Attorney, Agent, or Firm*—Oblon, Spivak, McClelland, Maier & Neustadt, P.C.

[57] ABSTRACT

A user interface apparatus for an electronic operation strip control system for supporting control services by presenting electronic operation strips used in airport control to a plurality of controllers who carry out airport terminal radar control services and entering control services previously distributed and associated with each other, including an information display device and an instruction input device provided for each controller. Operation strip control information items necessary for respective distributed control services are obtained and inputted into an information processing section, where the items are edited and processed in correspondence with the distributed control services and in accordance with contents of instructions from an instruction input device. Thereafter, the processed operation strip control information items are displayed on an information display device of a corresponding control seat, in accordance with instructions from the instruction input device, and simultaneously, operation strip control information items of related control services including operation strip control information items of the other control services are displayed on the same screen. It is therefore possible to reduce loads to controllers, to supply instructions more accurately and rapidly, and to enable visual communication between pilots and controllers.

13 Claims, 18 Drawing Sheets

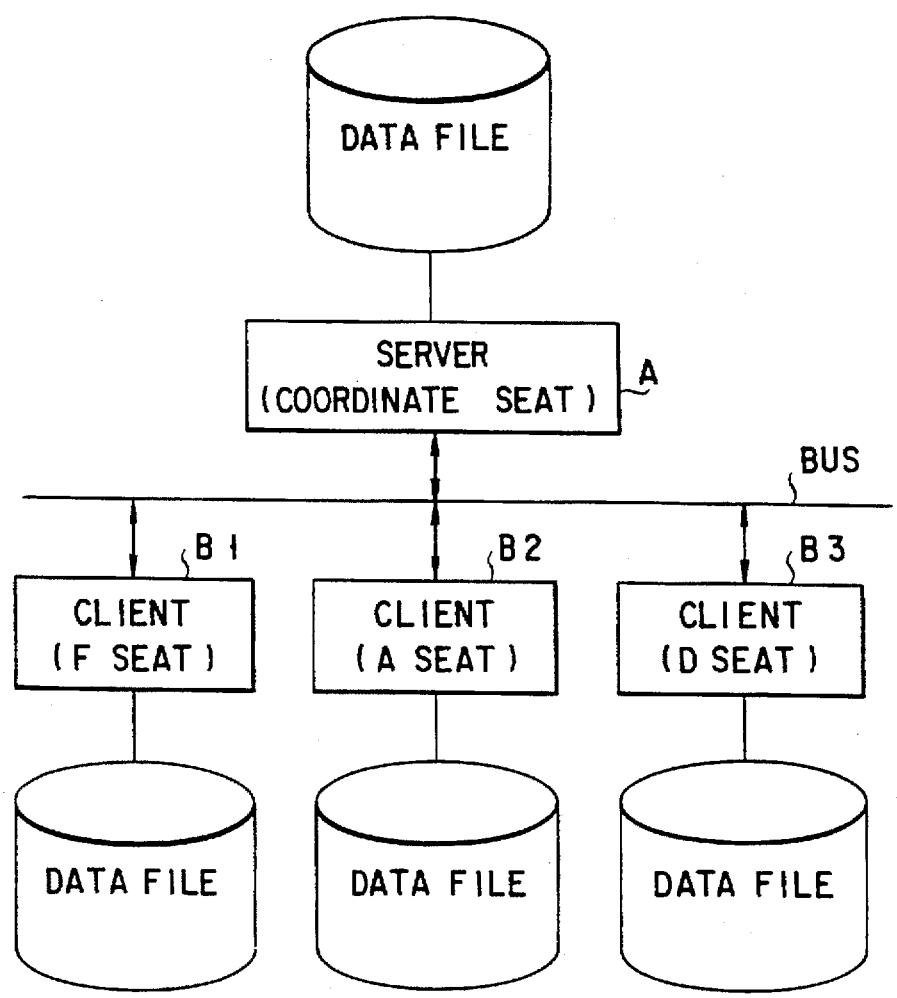
F I G. 1

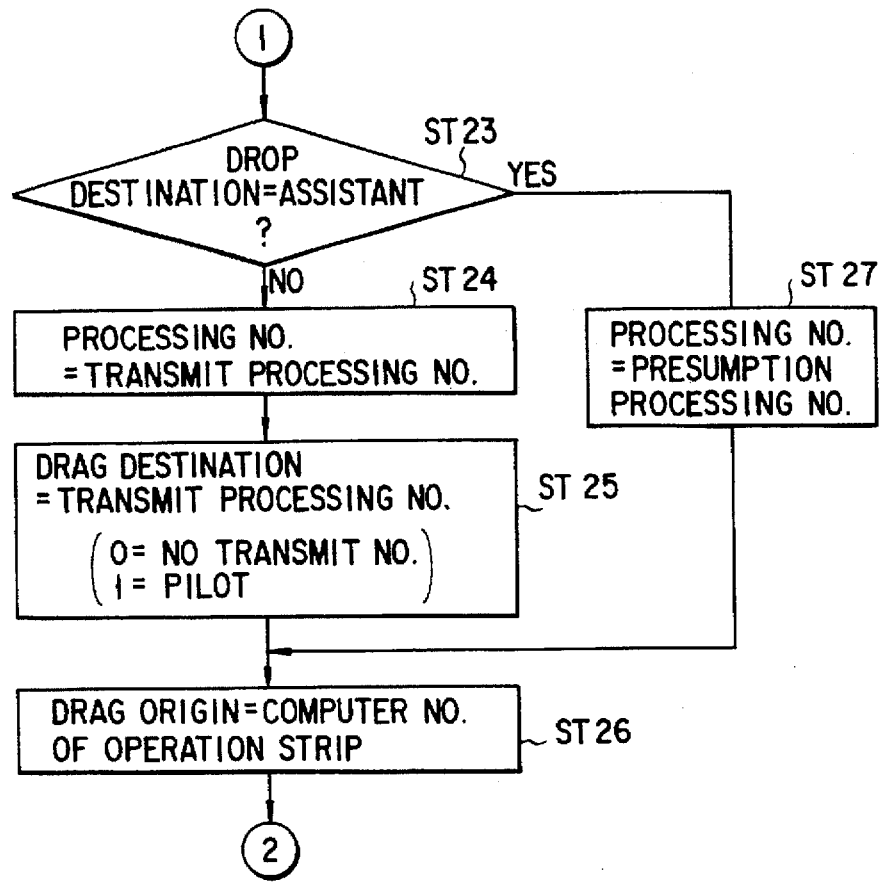
F I G. 7
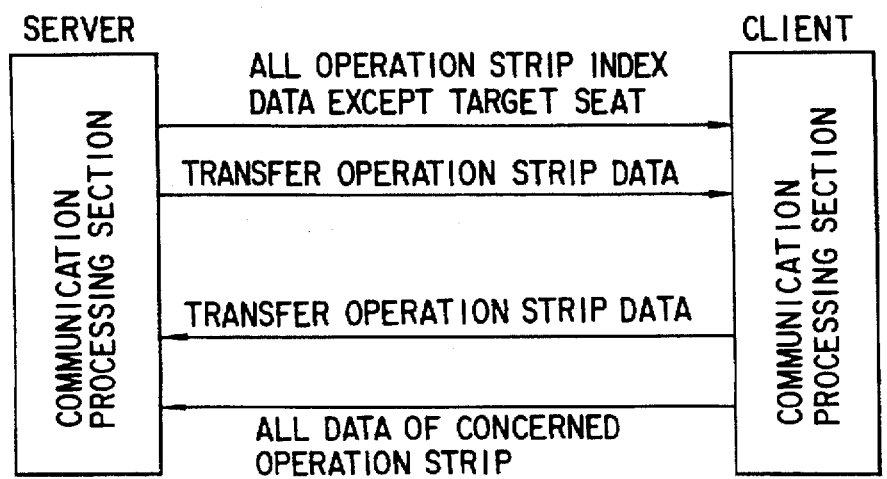
F I G. 8

| TRANSFER MODE DATA M(i) | 0 | 1 | 2 | 3 | 4 |
|---|---|---|---|---|---|
| ORIGINAL NO. OF TRANSFER DESTINATION | 1 | 2 | 3 | 5 | 5 |

COORDINATE  F  A  COMPLETE  COMPLETE

1 : COORDINATE SEAT
2 : F SEAT
3 : A SEAT
4 : D SEAT
5 : COMPLETION DATA REGISTRATION

FIG. 9A

COORDINATE  F  A  D

| MODE WHEN TRANSFERED M(i) | 0 | 1 | 2 | 3 | 4 |
|---|---|---|---|---|---|
| STRIP MODE DATA S(i) OF TRANSFER PERMISSION | 0 | 1 | 2 | 3 | 3 |

SET ENTER FIX PASS TIME

3 : COMPLETION DATA REGISTRATION

FIG. 9B

| | | |
|---|---|---|
| ZZZ333 FLIGHT DATA | | |
| QQQ566 FLIGHT DATA | 000200A | SERIES NO. AND DISTINCTION BETWEEN DEPARTURE (D) AND ARRIVAL (A) |
| PPP555 FLIGHT DATA | (1) ABC211 | CALL NAME OF AIRPLANE |
| ABC211 FLIGHT DATA | (2) B747 | TYPE OF AIRPLANE |
| | H | DIVISION OF REAR TURBULENCE |
| | (3) 0004 | COMPUTER NO. |
| | C | INFORMATION CONCERNING SSR DEVICES |
| | (4) 5301 | SECONDARY RADAR INDIVIDUAL CODE |
| | (5) ISE | ABBREVIATION OF ENTERING AVXILIARY FIX |
| | (6) | CONTROL ACCEPT LIMIT POINT |
| | (7) RJOO | DESTINATION |
| | (8) 2240 | ESTIMATED ENTERING AVXILIARY FIX PASS TIME |
| | (9) | ESTIMATED CONTROL LIMIT POINT ARRIVAL TIME |
| | (10) | ALTITUDE |
| | (11) | ABBREVIATION OF USED STAR |
| | (12) | WAY OF RECEIVING SERVICE TRANSFER |
| | (13) 39 | ENTERING FIX PASS TIME |
| | (14) | ABBREVIATION OF FIX WHEN USING STAND-BY ROUTE |
| | (15) | ESTIMATED ENTERING TIME |
| | (16) | ENTERING PERMISSION TIME |
| | (17) | ENTERING PERMISSION |
| | (18) | OTHERS |
| | (19) RJTT | PLACE OF DEPARTURE |
| | (20) 931021 | STRIP PREPARATION DATE |
| | (21) 0610 | STRIP PREPARATION TIME |

| (1) (2) | (5) (4) | (8) (7) | (10) | (13) (16) (14) (17) (15) (18) | |
|---|---|---|---|---|---|
| ABC211 | 5301 | RJ00 | 180 | | |
| B747/H | ISE | 2240 | | JTT | 941021 | 0610 |
| 0004C | | | | | | |
| (3) | (6) | (9) | (12) | (19) (20) (21) | |

FIG. 15B

| ABC211 | 5301 | RJ00 | 180 | | | |
|---|---|---|---|---|---|---|
| B747/H | ISE | 2240 | | 39 | | |
| 0004C | | | | JTT | 941021 | 0610 |

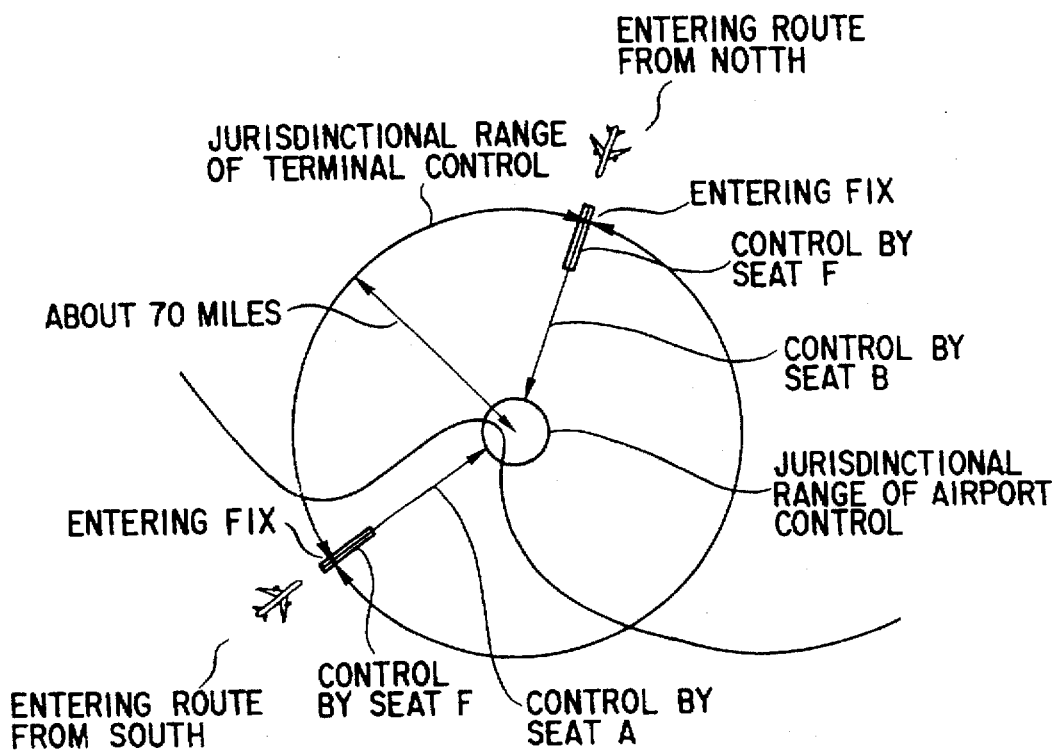
F I G. 19

AIR CONTROL SUPPORTING SYSTEM

This application is a continuation of application Ser. No. 08/444,278, filed on May 18, 1994, now abandoned.

BACKGROUND OF THE INVENTION

1. Field of the Invention

The present invention relates to a user interface apparatus for an electronic operation strip control system for supporting control services when a controller gives instructions to pilots of air planes in terminal control (which means terminal control services and approach control services, which will generally be referred to as terminal control) and routing control.

2. Description of the Related Art

In conventional terminal control and routing control, controllers have contacts or make confirmations with pilots and related persons on radio phones or cable phones while monitoring radars, in accordance with a printed operation strip of a flight plan of air-planes to be controlled. Further, controllers directly handle operation strips with their hands, make corrections, if any, into the strips with ball pens or the likes, and pass them by hands when they transfers the operation control to other persons.

However, with the manner of conventional terminal control as explained above, it has been difficult for controllers to exactly make a circumstantial judgment as the numbers of arrivals and departures of air-planes have increased. Transfers of operation strips and confirmations and changes of flight plans between controllers, as well as contacts with pilots have been complicated, so that it is difficult to make efficient control services.

Operations of controllers with use of operation strips have thus resulted in complicated works and over loads as the number of air-planes to be operated has increased. Today, a supporting system is demanded which reduces loads to controllers with respect to circumferential recognitions or judgments and feed-back thereof to operators and related persons, so that precise and rapid instructions could be provided.

Therefore, a user interface of an electronic operation system must necessarily have a form which reflects the rolls and services of controllers as well as their manners of thinking that have conventionally been taken over for long years. In this case, it is necessary not only to adopt the formats of operation control strips conventionally prepared by controllers as they are, as much as possible, but also to change styles of control information in accordance with purposes and circumstances, so that significant control information items could be presented in legible display formats to controllers.

SUMMARY OF THE INVENTION

As has been explained above, services by controllers with use of operation strips have led to complicated works and over loads as the number of air-planes has increased. Therefore, it has been demanded that a support system for control services should be provided which will reduce over loads to controllers with respect their circumferential recognitions and judgments as well as feed-back thereof to operators or related persons, and will enable accurate and rapid instructions. In addition, it has been demanded that communications between pilots and controllers should be made not only by voices but also by visual measures.

The present invention has an object of providing a user interface apparatus for an electronic operation strip control system which reduces loads to controllers with respect to their circumferential recognitions and judgments, as well as, feed-back thereof to operators and related persons, supplies more accurate and more rapid instructions than a conventional system, and further enables communication between pilots and controllers not only by audio measures but also visual measures.

Specifically, the user interface apparatus for an electronic operation strip control system provided by the present invention is a support tool for supporting a plurality of control services previously distributed and related to each other, which are to be carried out on the basis of operation control strips, in terminal control and routing control for promoting terminal radar control services and entry control services. This apparatus is characterized by comprising: an information display device and an input device both provided for each of seats to which the control services are respectively distributed, for performing the distributed service; information obtaining means for obtaining operation strip control information items necessary for each of the distributed control services; information processing means for editing and processing the operation strip control information items obtained by the obtaining means, on the basis of the distributed control services and in accordance with contents of an instruction from the input device provided for each control seat; and information outputting means for displaying the operation strip control information items obtained by the information processing means onto the information display device of a corresponding control seat, in accordance with the instructions from the input device provided for each control seat, and for displaying operation strip control information items of related control services on a screen of the same information display device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTIONS OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing a LAN structure of an embodiment of a user interface apparatus of an electronic operation strip control system according to the present invention;

FIG. 7 is a flow-chart showing contents of subsequent processing of FIG. 6;

FIG. 8 is a block diagram showing a state of data exchange between a server and a client of the embodiment;

FIGS. 9A and 9B are views each showing an example of an order of data transfer in the embodiment;

FIG. 10 shows an example of operation strip control data in the embodiment;

Figure 16:
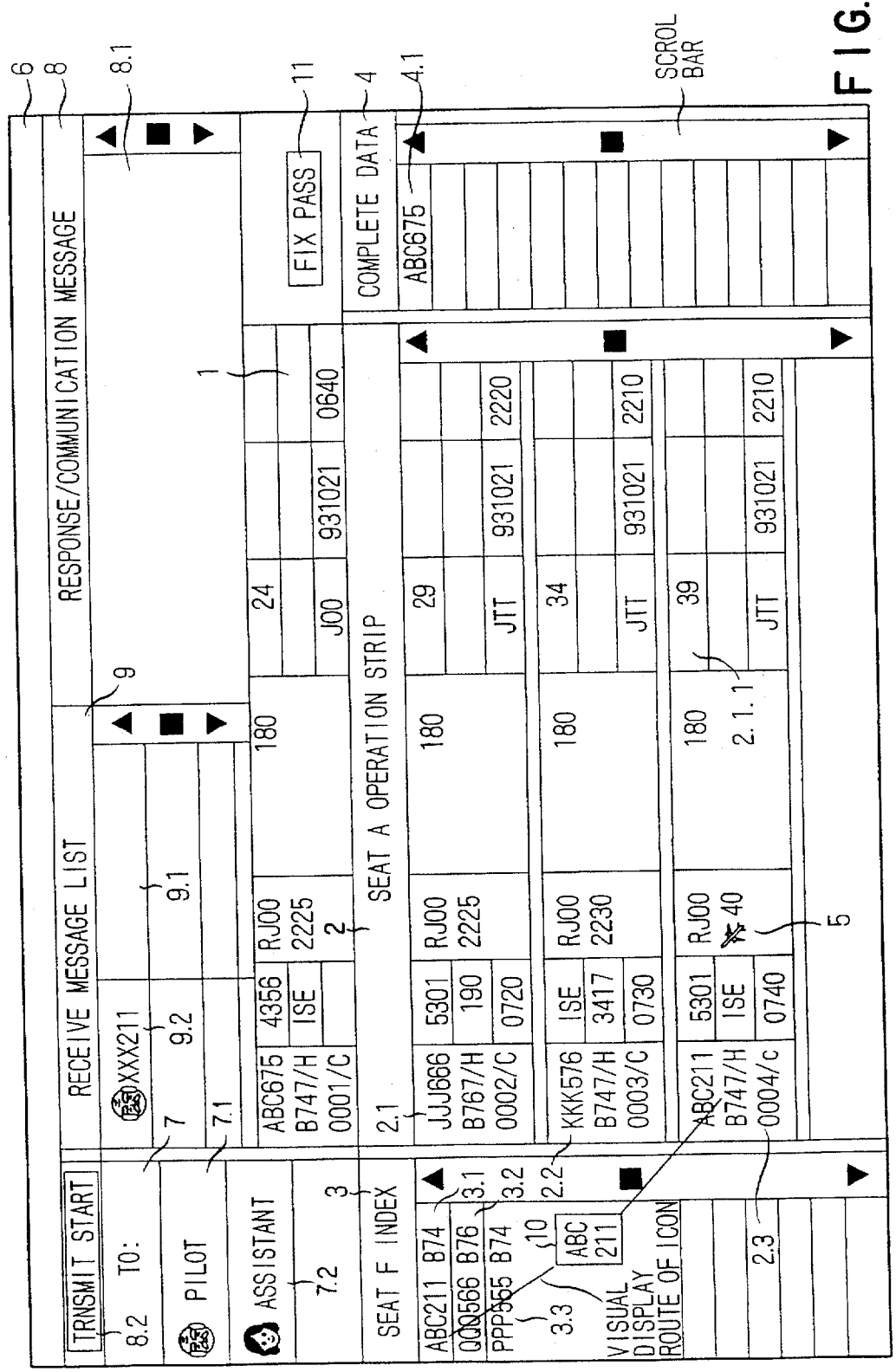
Figure 17:
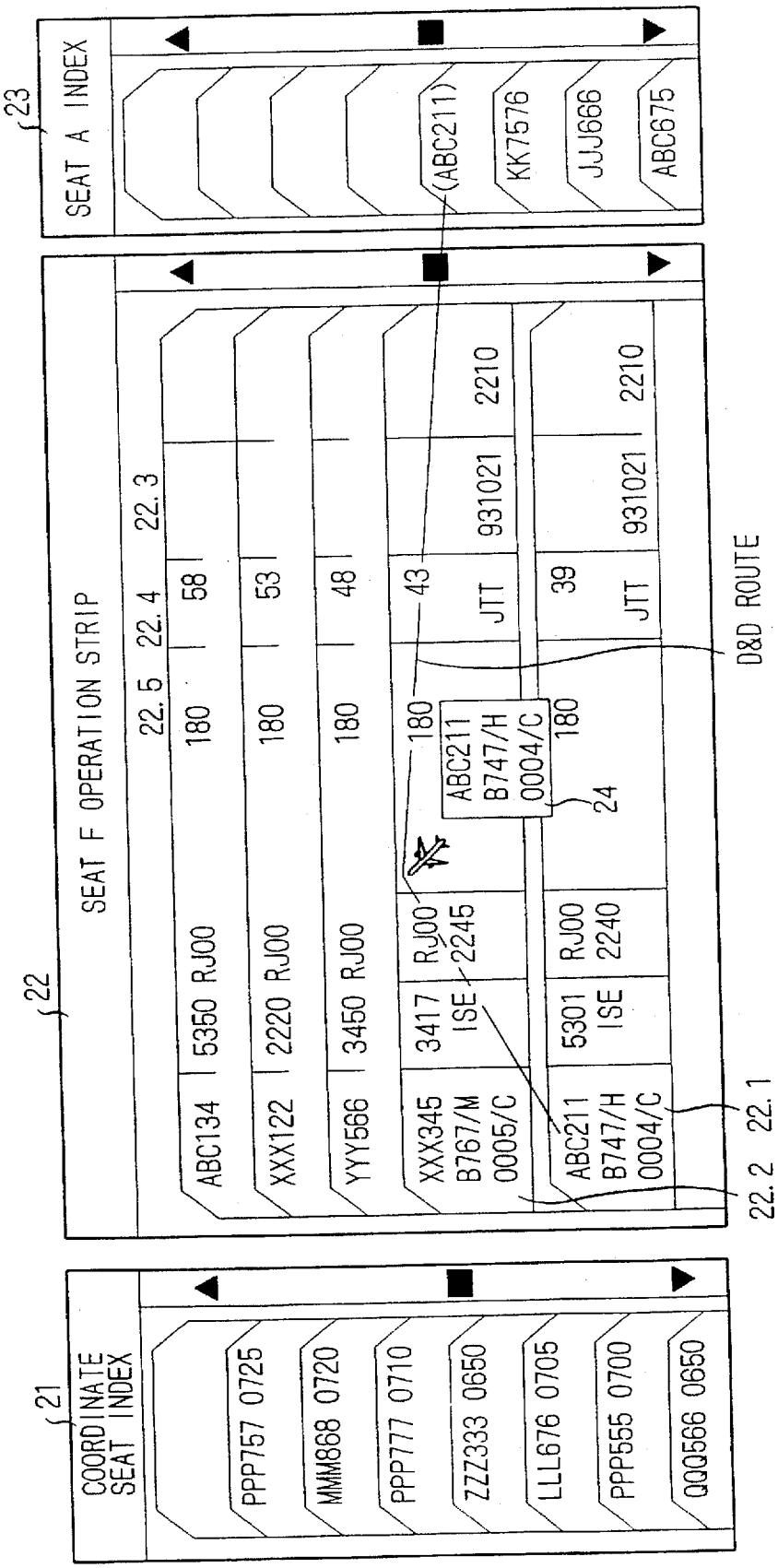
Figure 18:
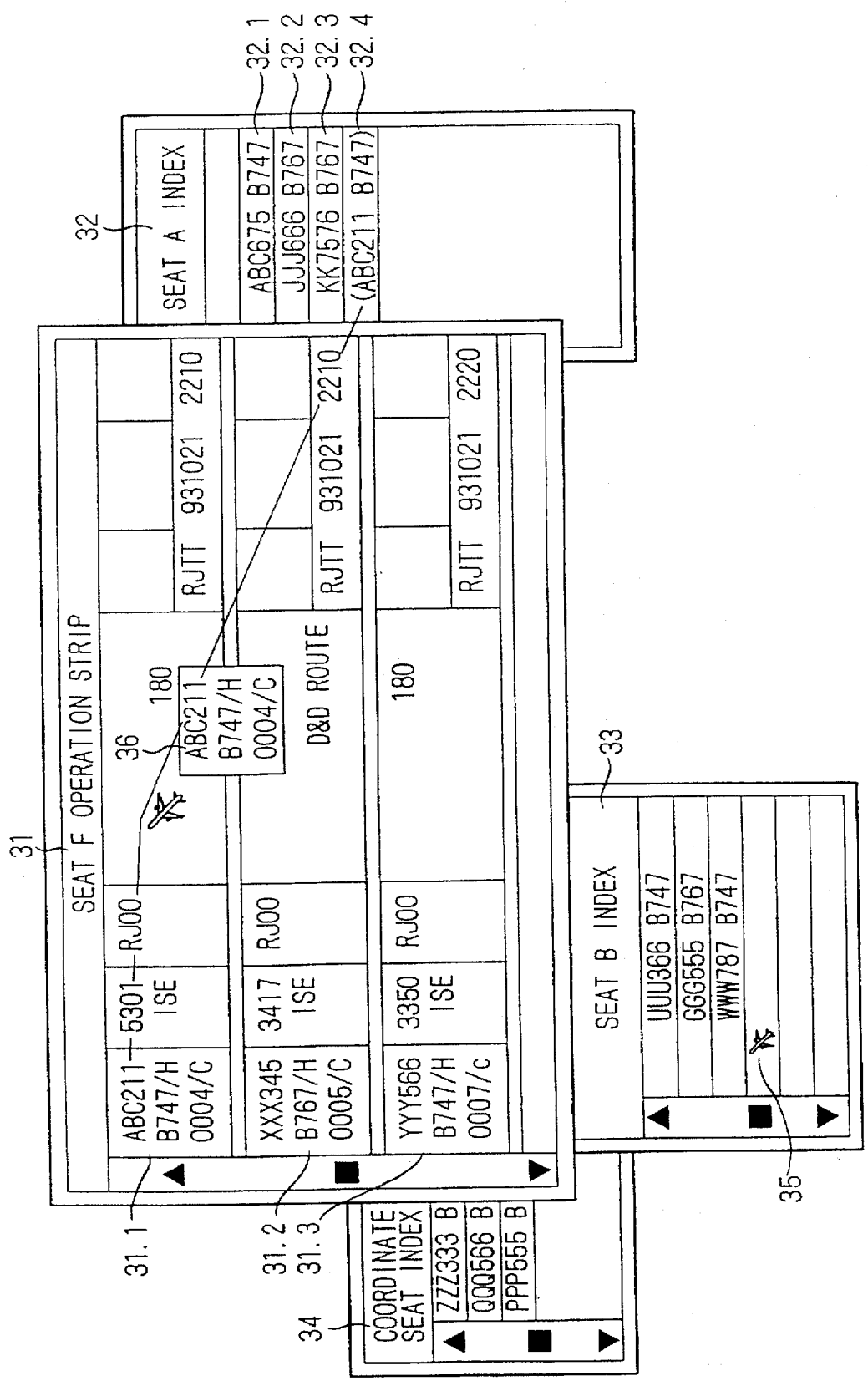

FIGS. 15A and 15B respectively shows strip examples of operation strip control data of the embodiment for types of processing;

FIG. 16 shows a D&D icon being transferred from a seat F to a seat A in the seat A and an example of a display screen where the icon has been transferred;

FIG. 17 shows an example of a display screen of operation strip control information which imitates a file holder, as another embodiment according to the present invention;

FIG. 18 shows an example of a display screen of operation strip control information which permits overlapping, as another embodiment according to the present invention; and FIG. 19 shows an example of a distributed range of entry area control using a terminal radar, explaining operation by a client on a seat F, as an embodiment stated above.

DETAILED DESCRIPTION OF THE PREFERRED EMBODIMENTS

In the following, an embodiment of the present invention will be explained with reference to the drawings. The explanation will be made supposing that services are supported for seats which are generally distributed as control services, i.e., a seat F (feeder seat), a seat A (arrival seat), a seat D (a departure seat), and a coordinate seat for distributing outputted operation strips.

FIG. 1 shows a network structure in the user interface apparatus of the electronic operation strip control system, where a reference A denotes a server and references B1 to B3 denote clients. The server and clients are connected with each other through a data bus BUS and each of them comprises an independent data file. In this embodiment, the server A serves as the coordinate seat, and the clients B1, B2, and B3 respectively serve the seats F, A, and D.

Figure 2:
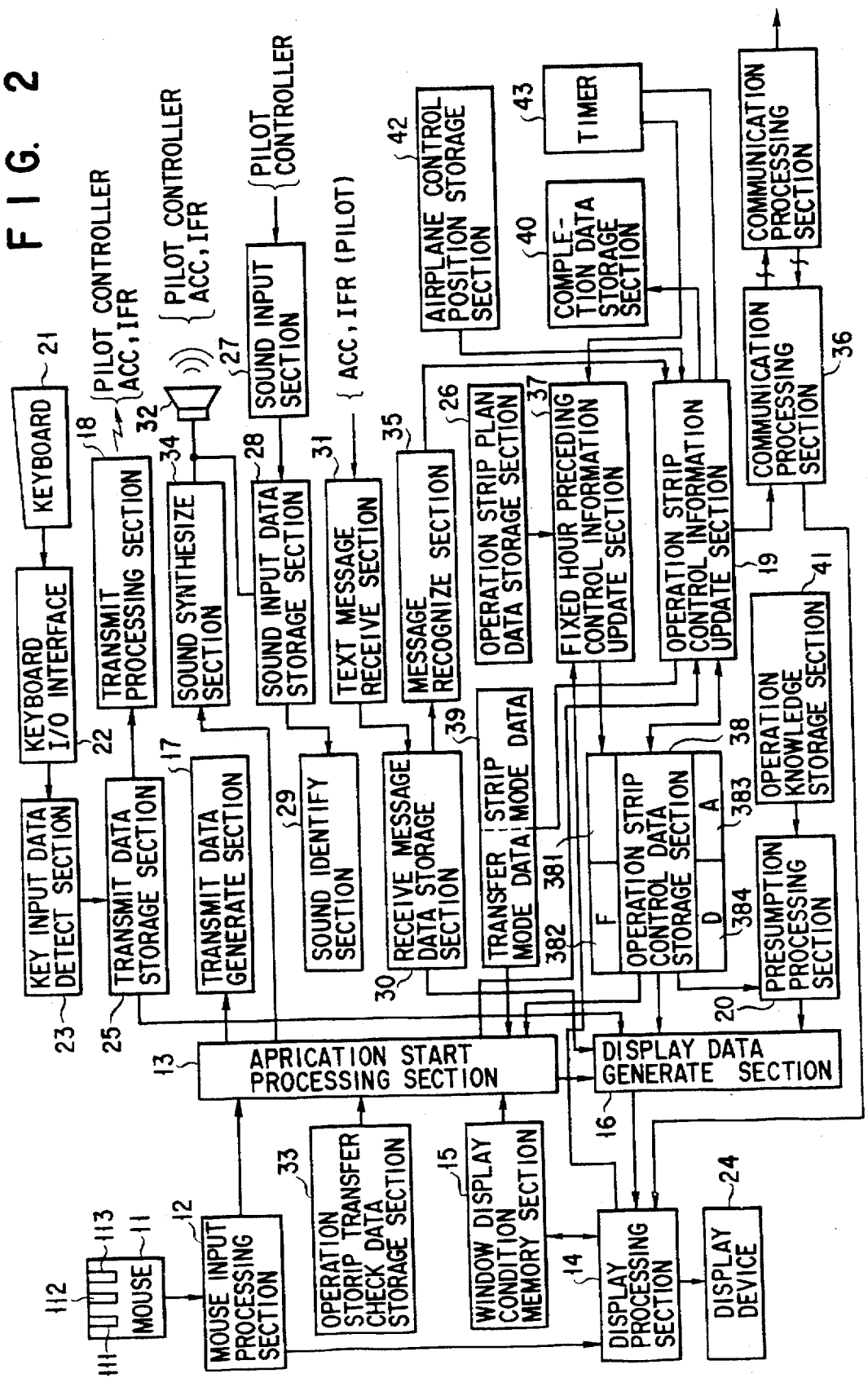
FIG. 2 is a block diagram showing a structure of the server side of the embodiment.
Figure 3:
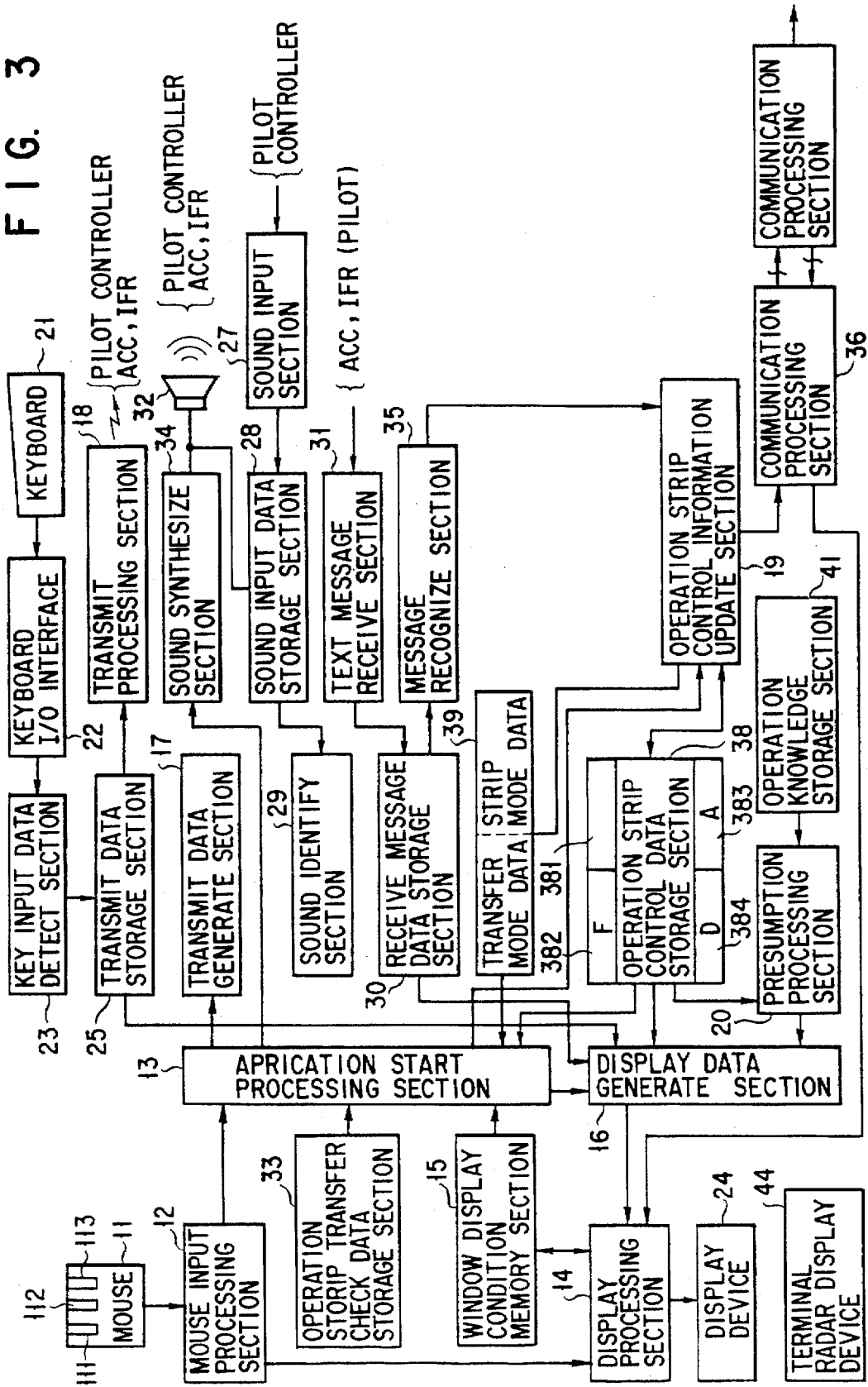
FIG. 3 is a block diagram showing a structure of the client side of the embodiment.

FIGS. 2 and 3 respectively show the structures of the server (or coordinate seat) A and a client (or seat F, A, or D). Note that the structure of the client B shown in FIG. 3 is substantially equal to the structure of the server A shown in FIG. 2, and therefore, those components of FIG. 3 which are common to FIG. 2 are denoted by common reference symbols, while only those components of FIG. 3 which are different from those of FIG. 2 will be explained in the following. Further, FIGS. 4 and 5 show specific structures of main parts.

In FIG. 2, a reference 11 denotes a mouse. This mouse 11 is used as an input means for specifying menu items and buttons displayed on a display device 24 which will be described later. Data inputted by this mouse 11 is sent to a mouse input processing section 12.

Figure 4:
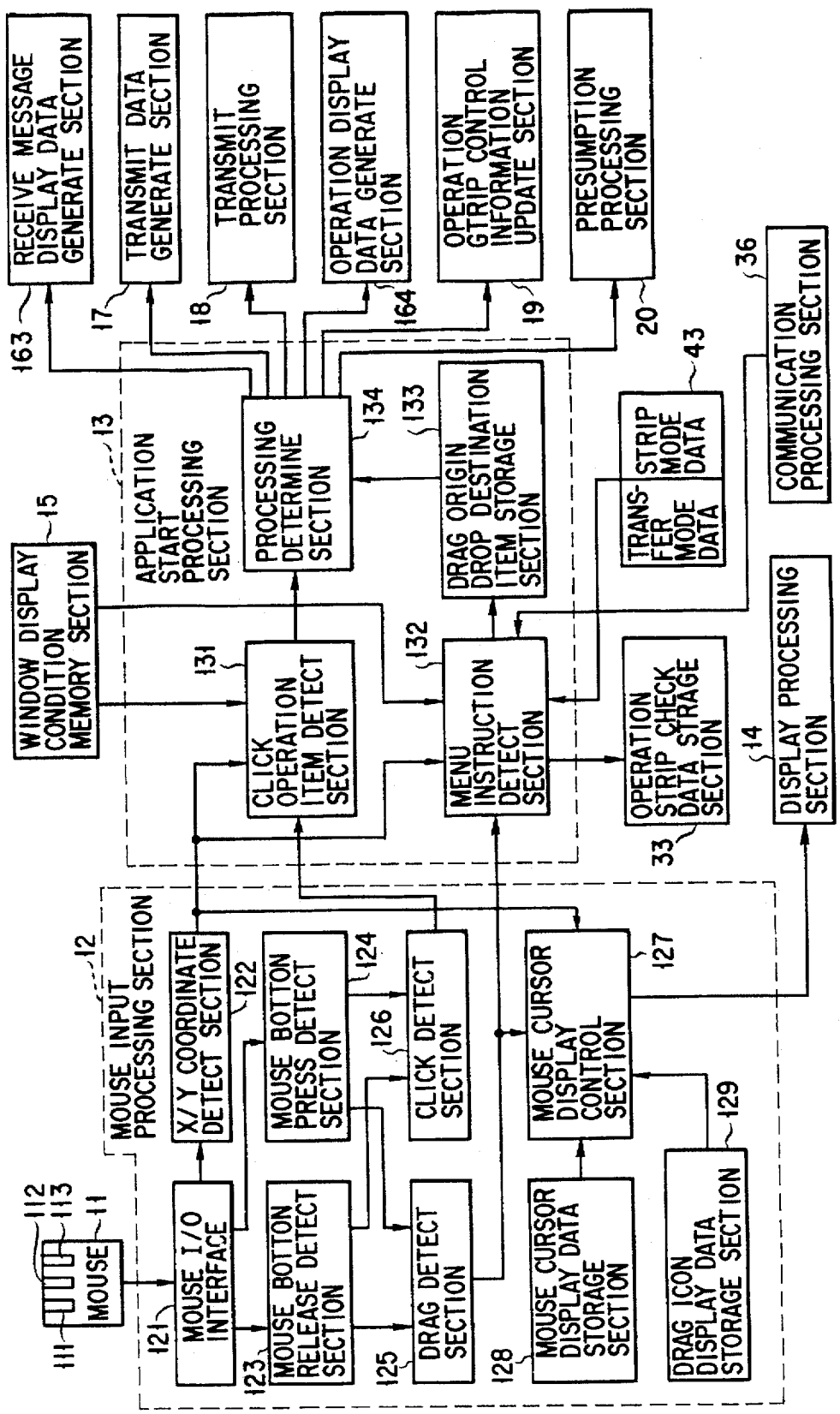
FIG. 4 is a block diagram showing a specific structure of a mouse input processing section and an application start processing section of the embodiment.
Figure 5:
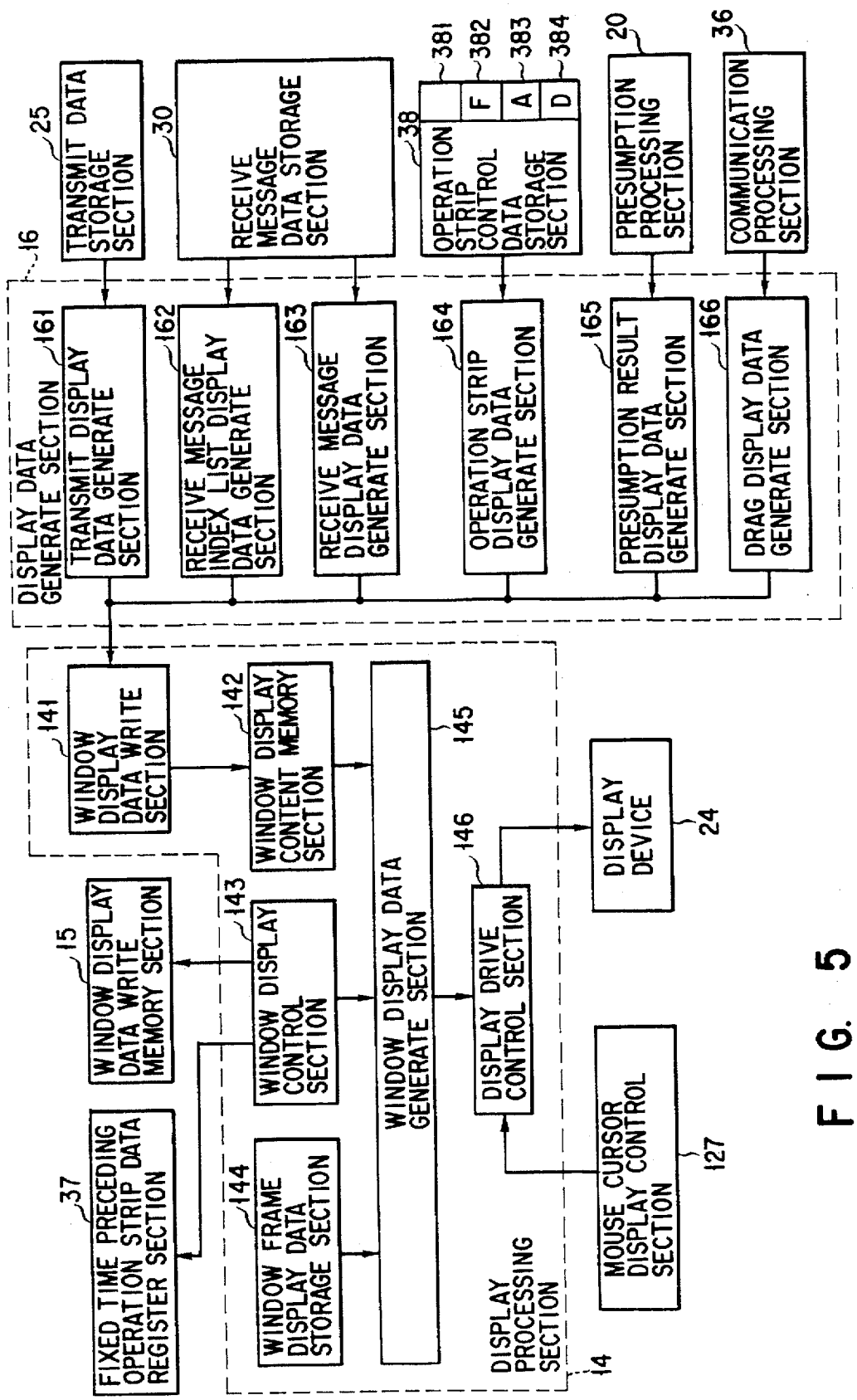
FIG. 5 is a block diagram showing a specific structure of a display processing section and a display data generating section of the embodiment.

The mouse input processing section 12 is arranged as shown in FIG. 4. In FIG. 4, mouse input data outputted from the mouse 11 is inputted into an X/Y coordinate detect section 122, a mouse button release detect section 123, and a mouse button press detect section 124 through a mouse I/O interface 121.

The X/Y coordinate detect section 122 is used to detect X/Y coordinates from mouse input data. X/Y coordinates detected by this section are sent to a mouse cursor display control section 127, and are simultaneously supplied to both of a click operation item detect section 131 and a menu specify detect section 132.

In addition, a mouse button release detect section 123 and a mouse button press detect section 124 are used for respectively detecting operations of releasing and detecting the mouse button from the mouse input data. Results of mouse button operations are all sent to the drag detect section 125 and the click detect section 126.

The drag detect section 125 is used to detect that drag and drop operations have been performed by a middle button 112 of the mouse 11, from the mouse button operation results sent from the mouse button release detect section and the mouse button press detect section 124. The detect results are sent to the menu specify detect section 132 of the application start processing section 13 and simultaneously to the mouse cursor display control section 127.

The click detect section 126 is used to detect that a click operation has been performed with respect to items by a left button of the mouse 11, from the mouse button operation results sent from the mouse button release detect section 123 and the mouse button press detect section 124, and the detection result is sent to a click operation item detect section 131 of the application start processing section 13.

In this case, mouse cursor display data for specifying a pointing position on a display screen is previously stored in the mouse cursor display data storage section 128. In addition, drag icon display data which is to be displayed along a drag manner when the middle button 112 of the mouse 11 is kept pressed (i.e., when a drag operation is performed) is previously stored in the drag icon display data storage section 129.

The mouse cursor display control section 127 is used to selectively read corresponding mouse cursor display data and drag icon display data from the mouse cursor display data storage section 128 and the drag icon display data storage section 129 when display coordinate data is inputted from the X/Y coordinate detect section 122 or when drag and drop operation data is inputted from the drag detect section 125. The display data thus read is sent to a display drive control section 146 of the display processing section 14.

In the application start processing section 13, the click operation item detect section 131 compares the mouse cursor coordinate data sent from the X/Y coordinate detect section 122 and the click detect section 126 when the mouse is clicked, with display coordinate data concerning menus and buttons stored in a window display state storage section 15 described later, thereby to detect the input item when a click operation is performed. The input item thus detected is sent to a processing determine section 134.

The menu, instruction detect section 132 compares mouse cursor coordinate data concerning a drag operation start point and a drag operation end point (i.e., a drop operation) of the mouse, which is sent from the drag detect section 125, with storage data in the window display state storage section 15 described later, thereby to detect the input item and a processing number when the drag start operation and the drop operation are performed. The input item detected and processing number thus detected are sent to a drag source/ drop destination storage section 133.

In case where a drag and drop operation is performed, the menu specify detect section 132 makes references to transfer direction check data and transfer data preparation check data, thereby to check whether or not detect processing should be carried out, when the drag source and the drop destination respectively specify operation strip items of different control seats. Then, when the transfer direction is previously inhibited, the operation itself is ignored. In case where control data for transfer is insufficient, transfer processing of operation strip data is voided, and lacking data items are displayed by a pop-up window. Then, the display returns to an original state before the operation, upon receipt of an confirmation input by a controller.

The drag source/drop destination source section 133 is used to temporarily store menu specify items at the times when a drag operation is started and a drop operation is performed in a series of mouse operations from a drag to a drop which are detected by the menu specify detect section 132. The operation items are sent to the processing determine section 134.

The processing determine section 134 is used to determine the following processing contents, depending on the type of a mouse operation and an operation item from a click operation item detect section 131 or a drag source/drop destination item storage section 133. In accordance with the determination results, the section 134 shifts the control to any of a receive message display data generate section 163 of a display data generate section 16, a transmit data generate section 17, a transmit processing section 18, an operation strip display data generate section 164, an operation control information update section 19, or a presumption processing section 20.

As shown in FIG. 5, the display processing section 14 comprises a window display data write section 141, a window display content storage section 142, a window display control section 143, a window frame display data storage section 144, a window display data generate section 145, and a display drive control section 146.

The window display control section 143 makes the window display data generate section 145 generate a window frame from the window frame display data storage section 144 and display content data from a window display content storage section 142 in response to a display request using an application from an initial state and the processing determine section 134. In addition, the control section 143 makes the window display condition storage section 15 store display items, display coordinates, and display orders, such as, a window to be displayed, command specify buttons and a menu display in the window.

The window display data generate section 145 is used to read data stored in the window display data storage section 144 and the window display content storage 142, thereby to generate display data of the window.

The display drive control section 146 is used to drive a display device 24 such as a CRT, on the basis of window display data sent from the window display data generate section 145 and mouse cursor display data sent from the mouse cursor display control section 127.

The window display condition storage section 15 is used to store various display items, display coordinates, and display orders, such as, the window, command specify buttons, and menu display bars being displayed on the screen of the display device 24.

The display data generate section 16 comprises a transmit display data generate section 161, a receive message index list display data generate section 162, a receive message display data generate section 163, an operation strip display data generate section 164, a presumption result display data generate section 165, and a drag display data generate section 166.

The transmit display data generate section 161 is used to read data from the transmit data storage section 25, to prepare data to be displayed in a communication message display region, and to send the display data to the window display data write section 141.

The receive message index list display data generate section 162 is used to read receive message data from the receive message data storage section 30 and to prepare a list of index data (e.g., a transmit source, top data of a message, and the likes) to be displayed on the display device 24.

The receive message display data generate section 163 is started by the processing determine section 134 through the click operation item detect section 131 when item data prepared by the receive index list display data generate section 162 and displayed on a receive message list display region (i.e., the display region 9 shown in FIGS. 11 to 14) of the display device 24 is clicked by the mouse 11, to read data from the receive message data storage section 30 and to generate display data to be displayed on the response/ communication message display region 8 shown in FIGS. 11 to 14.

The operation strip display data generate section 164 is used to read information concerning operation strip control information to be displayed in the display regions 1, 2, 3, and 4 shown in FIGS. 11 to 14, from the operation strip control data storage section 38 (381 to 384), thereby to appropriately prepare display data.

The presumption result display data generate section 165 is used to display processing results of the presumption processing section 20.

The drag display data generate section 166 is used to prepare display data for drag-displaying information sent from other seats through the communication processing section 36.

The transmit data generate section 17 is used to prepare corresponding transmit data (or text data) and store the data into the transmit data storage section 25, when information (e.g., a drag source and a drop destination) indicating that a drag and drop operation from any of data items (2.1 to 2.3) of the operation strip display region 2 shown in FIGS. 11 to 14 to a transmit target display regions 7.1 and 7.2 has been performed is sent from the processing determine section 134, and to read and control corresponding transmit data if such corresponding transmit data has already been stored.

For example, when an operation strip of a region 2.1 is subjected to a D&D (or drag and drop) operation to a region 7.1, the pilot of a flight code ABC211 in the operation list of the rejoin 2.1 is determined as the final transmit target.

The transmit processing section 18 selects corresponding text data from the transmit data storage section 25 when a click operation of a transmit start button (i.e., the region 8.2 in FIGS. 11 to 14) is notified by the processing determine section 134, and transmits the selected text data to the transmit target in the dropped or clicked transmit target in the transmit target display region 7 shown in FIGS. 11 to 14 (i.e., the pilot or assistant in regions 7.1 and 7.2).

In this state, the text data is sent to a voice synthesize section 34, and is monitor-outputted as voices. In addition, this text data is sent to the transmit display data generate section 161 of the display data generate section 16, and is displayed in the communication message display region 8 by the processing as stated above.

Meanwhile, the keyboard 21 is used as input means for inputting transmit data. Specifically, when the mouse cursor is moved to the communication message display region 8 of the display device 24 and the left button 111 of the mouse 11 is clicked, an input cursor (e.g., a CARET or the like) is displayed. If data is inputted by using keys In this state, the inputted data is stored into the transmit data storage section 25 through a keyboard I/O interface 22 and a key input data detect section 23, and is simultaneously displayed in the communication message display region 8 in accordance with processing by the display data generate section 16 and the display processing section 14.

The operation strip plan data storage section 26 is used to store plan data of an operation strip previously prepared.

The voice input section 27 is used to input requests or confirmed information made given by conversations from pilots of airplanes in the form of voices, and voice data obtained thereby is stored into the voice input data storage section 28. The stored voice data is sent to the voice recognize section 29 and is also sent to the voice output section 32, thereby to output the data as voices.

The voice recognize section 29 is used to convert voice input data from the voice input section 27 into text data, by recognizing voices in accordance with a voice recognize method for a talker or not specified. The text data thus obtained is stored as receive message data into the receive message data storage section 30.

The text message receive section 31 receives response messages from inquiries from pilots, in form of text data, and the text message data thus obtained is stored into the receive message data storage section 30, as receive message data.

The voice output section 32 reads data from the voice input data storage section 28 containing contents of conversations, and reproduces and outputs the data, when receive messages by voice inputs are displayed on the communication message display region 8 shown in FIGS. 11 to 14.

The message interpret section 35 reads message data from the receive message data storage section 30, extracts operation information such as altitude information and the like, and sends the information to the operation strip control information update section 19.

The operation strip control information update section 19 updates the contents of the operation strip control data storage section 38 which presently is a control target, in correspondence with control information extracted from receive data of an operation request from a pilot to a controller, obtained by the message interpret section 35, or from transmit data (e.g., voice data or text data) to be supplied to a pilot from a controller.

In the operation strip control information update section 19 of a server, every time when information of an operation strip issued for each airplane is transferred to another control seat, a record concerning control seat numbers (1: coordinate seat, 2: seat F, 3: seat A, 4: seat D) is updated. Further, data of data storage regions 381 to 384 corresponding to control positions (e.g., the coordinate seat, seat F, seat A, and the seat D) stored in the airplane control position storage section 46 is updated, and simultaneously, write accesses from a plurality of control seats are permitted.

On the other hand, clients B to D perform self-control with respect to updating of operation strip control data of their own, send updated contents to the server A through the communication processing section 36, and store the contents into the operation strip control data storage section 38. Operation strip control index data of another control seat is updated by receiving updated data from the server A. The entire access control of the server A and clients B to D is thus realized.

In addition, as shown in FIGS. 9A and 9B, the operation strip control information update section 19 updates transfer mode data M(i) and strip mode data S(i) (where i denotes a computer number and the data M(i) and S(i) will be each referred to as mode data), and sends both of the data together with the operation control data to another control seat through the communication processing section 36, when the these data applied to the operation control data. When operation control data and mode data is received from another control seat through the communication processing section 36, the operation strip control information update section 19 updates the mode data together with corresponding operation strip control data.

The mode data thus updated are stored into the mode data storage section 43, separated in accordance with modes, and are sent to the menu specify detect section 132 of the application start processing section 13, if necessary. Further, information of operation strip control data storage section 38 whose processing of control has been completed is transferred to the completion data storage section 44.

Figure 12:
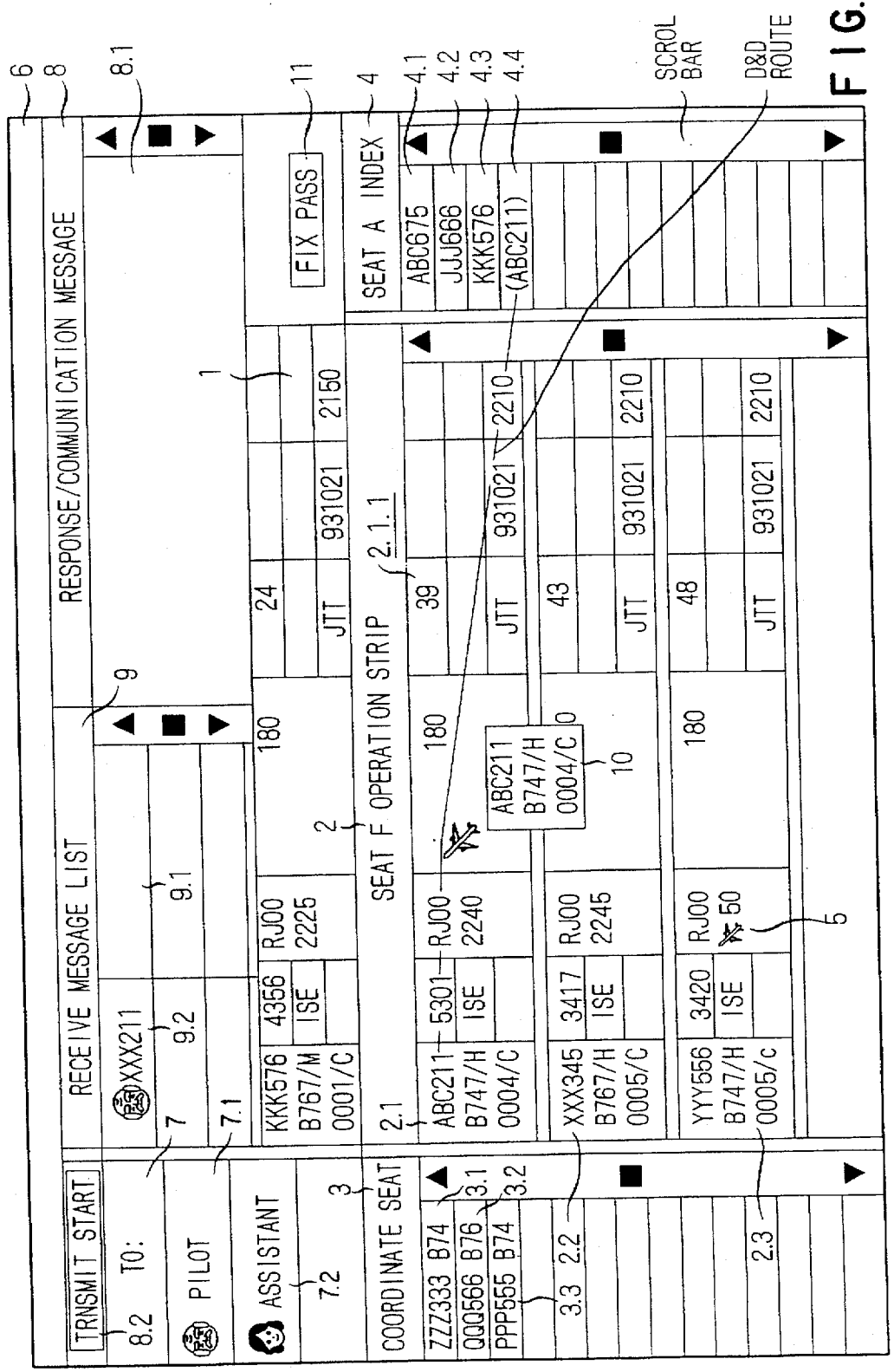
FIG. 12 shows an example of a display screen of a seat F of the embodiment.

In this case, the transfer direction and preparation conditions of data items are checked by the menu specify detect section 132. Therefore, when a drag and drop operation occurs from an operation strip 2.1 of the seat F to an index 4.4 of an operation strip of the seat A, as shown in FIG. 12, the operation strip control information update section 19 copies information of a specified data item of the operation strip of the seat F from the seat F operation strip control data storage region 382 to the seat A operation strip control data storage region 383, and deletes the information from the data storage region 382, after the copying is properly completed.

The communication control processing section 36 is a communication control processing section for transmitting operation control data and the likes to another control seat or for receiving data from another control seat.

The predetermined time preceding operation data register section 37 uses a timer 47 to make registration to the coordinate seat operation strip control data storage region 381, e.g., before 30 minutes from a departure time of an airplane registered in the operation strip plan data storage section 26.

The operation strip control data storage section 38 stores operation strip control data controlled by each control seat, and comprises data storage regions 381 to 284 respectively controlled a coordinate seat, a seat F, a seat A, and a seat D.

The operation knowledge storage section 45 is used to store operation knowledges necessary for the presumption processing section 20.

Figure 6:
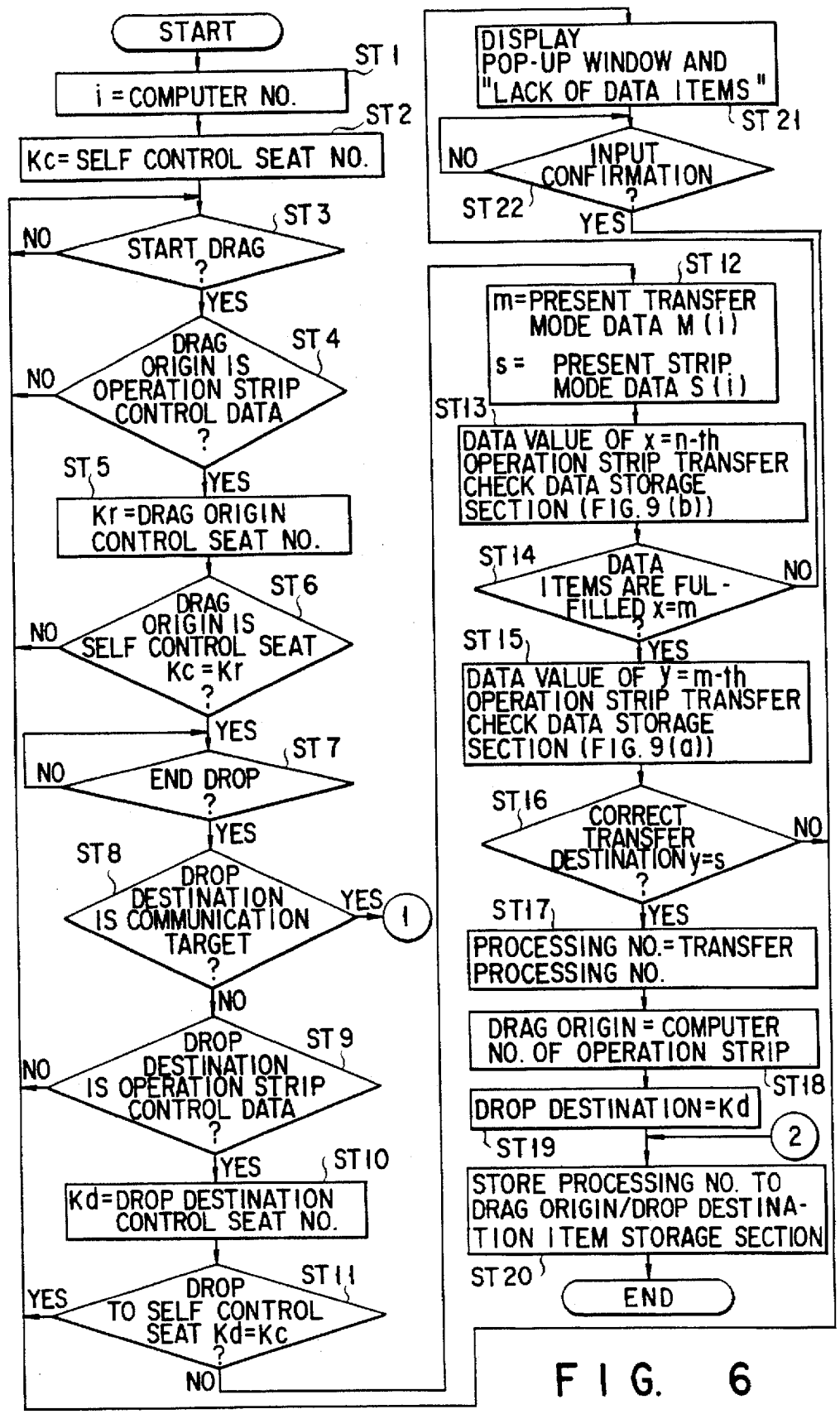
FIG. 6 is a flow-chart showing contents of processing of a menu instruction detecting section of the embodiment.

Contents of processing by the menu specify detect section 132 in the application start processing section 13 will now be explained with reference to flow-charts shown in FIGS. 6 and 7.

At first, as an initial state, a computer number i is set (in a step ST1), and self-control seat numbers Kc (e.g., 0: no control seats, 1: coordinate seat, 2: seat F, 3: seat A, and 4: seat D) are set (in a step ST2).

Then, a start of drag is waited (in a step ST3), and if a drag is started (YES), determination is made as to whether data of the drag source is operation strip control data (in a step ST4). Here, if the data of the drag source is not operation strip control data (NO), the data is neglected. If the data is operation strip control data (YES), the control seat number is registered as Kr (in a step ST5).

In this time point, whether or not the registered number Kc of the drag source is a self-control seat registration number Kr (Kc=Kr) is determined (in a step ST6). If Kc=Kr is not satisfied (NO), the data is neglected. If Kc=Kr is satisfied (YES), a drop operation is waited.

If a drop operation is completed (YES), whether or not the drop destination is a communication target is determined (in a step STS). If the drop destination is the communication target (YES), the processing goes to the step ST23 shown in FIG. 7. If the drop destination is not the communication target (NO), whether or not the drop destination is operation strip control data is determined (in a step ST9). Then, if the drop destination is not the operation strip control data (NO), the drop operation is neglected. If the drop destination is operation strip control data (YES), the control seat number of the drop destination is registered as Kd.

Here, whether or not the registration number Kd of the drop destination is self-control seat registration number Kc (Kd=Kc) is determined (in a step ST11). Then, if Kd=Kc is satisfied (YES), the number Kc is neglected. If Kd=Kc is not satisfied (NO), current transfer mode data M(i) is registered as a parameter m, and current strip mode S(i) is registered as parameter s. Subsequently, the data value of an n-th operation strip transfer check data storage section 33 is registered as a parameter x (in a step ST13, as shown in FIG. 9B).

Then, whether or not data items are prepared (i.e., whether or not x=m is satisfied) is determined (in a step ST14s if). If x=m is not satisfied (NO), the processing goes to a step ST21. If x=m is satisfied, the data value of an m-th operation strip transfer check data storage section 33 is registered as a parameter y (in a step ST15, as shown in FIG. 9A).

Next, whether or not the transfer destination is correct (i.e., whether or not y=s is satisfied) is determined (in a step ST16). Then, if y=s is not satisfied (NO), the processing is neglected. If y=s is satisfied (YES), a transfer processing number is registered as a processing number (in a step ST17), the computer number i is registered into the drag source (in a step ST18), the drop destination registration number Kd is registered (in a step ST19), and further, a processing number is stored into a drag source/drop destination item storage section 133 (in a step ST20). Then, the processing ends.

In the step ST14, if x=m is not satisfied (NO), a pop-up window is opened, and a message "lack of data items" is displayed therein (in a step ST21). Then, a confirmation operation is waited (in a step ST22), and if there is a confirmation, the processing return back to the step ST3.

Meanwhile, in the step ST8, if the drop destination is a communication target (YES), whether or not the drop destination is an assistant is determined (in a step ST23). If the drop destination is not an assistant (NO), the transmit processing number is registered as the processing number (in a step ST24), and the transmit destination number is registered in the drag destination (in a step ST25). Here, "0" means no transmit number, and "1" means a pilot. Further, the computer number of the operation strip is registered in the drag source (in a step ST26), and the processing goes to the step ST20 stated above.

In addition, in the step ST23, if the drop destination is an assistant (YES), the presumption processing number is registered as the processing number (in a step ST27), and the processing goes to the step ST26.

In this embodiment, communication is made between a server (or a coordinate seat) A and clients (or the seats F, A, and D) B1 to B3. Therefore, communication between the clients B1 to B3 each other is always performed by the server A. The range of communication data between the server A and the clients B1 to B3 varies as follows. The data exchange therebetween is shown in FIG. 8, and an example of the order of data transfer is shown in FIGS. 9A and 9B.

The server A performs control so as to have operation strip control information of all the clients B1 to B3.

(1) The followings are transmit data from a server to clients.

* All data and transfer/strip mode data of the operation strip of an airplane having a computer number i to be transferred.

* All operation strip index data and transfer/strip mode data other than a transmit target when an operation strip control information is changed in any of the server and clients.

(2) The followings are transmit data from clients to a server.

* All data and transfer/strip mode data of the operation strip of an airplane having a computer number i to be transferred.

* All operation strip index data and transfer/strip mode data other than a transmit target when an operation strip control information is changed in a client itself.

Meanwhile, an electronic mail system, a dispersion development circumstance system, are recited as examples in which a plurality of workers perform correspondence, confirmation, or acceptance of information through their own computer terminals. In the present invention, transfer of operation strip information to each other is performed between controllers, through conversations with distributed computer terminals, with use of a communication method like an electronic mail, in the same format as that of a conventional operation strip or in a changed format according to purposes or circumstances.

In this case, while monitoring a radar screen as in a conventional apparatus, a next operation specify candidate with respect to the airplane as a control target is presumed from the situation of airplanes on a radar screen, the contents of conversation concerning the control, and the knowledge base concerning the operation. The candidate is automatically presented to controllers by computers, so that loads to controllers as to their determinations can be reduced.

Therefore, to carry out a transfer operation, each controller can specify an appropriate transfer designation of an operation strip, while referring to flight situations of airplanes and processing situations of other controllers, which are displayed together on a common screen. As a result, the efficiency in control services can be improved.

In addition, messages from a pilot or an inquiry destination and contents of a talk from a controller can be converted into text information by a voice recognize section, and portions of information which are necessary for control can be automatically identified. Based on the information, information of an operation strip is automatically changed through confirmation by a controller. Therefore, key-inputting need not be newly performed to store information, complicated information input services can be reduced.

Feed-back of information to other controllers and pilots can be carried out in form of voices or display indications, or in form of both of them, with use of operation strip information confirmed in each stage of control and a fixed transmit message used conventionally.

An example of operation control data is shown in FIG. 10, while an example of a display screen is shown in FIGS. 11 to 14, to explain operation measures of transfer processing of operation strips.

FIGS. 11 to 14 show a window display screen using a tie-ring method, as an embodiment of a computer terminal screen for a control target seat in the present invention. FIGS. 11 to 14 respectively show display screens of a coordinate seat, a seat A, a seat F, and a seat D.

In FIGS. 11 to 14, a reference numeral 1 denotes a window for displaying all data of an operation strip indicated as an index of other control seats than the one displaying the window.

A reference numeral 2 denotes a window for displaying operation strip information of the control seat as a target. In this window 2, references 2.1 to 2.3 respectively show operation strip information of airplanes to be controlled, in formats conventionally used.

A reference numeral 3 denotes a window for displaying an operation strip information index of a control seat as a source from which control should be transferred to a control seat as a target. In this window 3, references 3.1 to 3.3 respectively show operation information indexes of transfer sources (i.e., names of airplanes in this case).

A reference numeral 4 denotes a window for displaying an operation strip information index of a control seat as a destination to which control should be transferred. In this window 4, references 4.1 to 4.4 respectively show display regions of operation information indexes of transfer destinations (i.e., names of airplanes in this case).

In each of control seat terminals shown in FIGS. 11 to 14, a mouse display cursor 5 is moved to, for example, the item of a flight code (e.g., ABC211) of a region 2.1 in a window 2 of a control target seat (i.e., a control seat which called as a control target seat for convenience although the control target seat is not used for control services) and the mouse button 112 is pressed. Then, a moving drag and drop icon (which will be referred to as a D&D icon hereinafter) 10 is displayed together with a cursor 5. In addition, in FIGS. 11 to 14, a single mouse display cursor 5 and another mouse display cursor 5 paired with a D&D icon 10 are displayed on one single display screen for convenience.

If the D&D icon is moved to an empty item region 4.4 while pressing a mouse middle button 112 and is then released, operation strip information of the region 2.1 of a control target seat is transferred to a control seat of a transfer destination. In this case, the operation strip information is deleted from the region 2.1 of the control target seat to be presently controlled, index information (e.g., flight codes in this case) which has been displayed in the region 2.1 is displayed in the region 4.4.

In the above case, only the first flight name information among operation strip information displayed in the region 2.1 is representatively displayed as a D&D icon 10 of operation strip information. However, the entire portion expressing the operation strip may be displayed as the D&D icon 10 and may be moved in accordance with a D&D operation. In addition, an icon or a cursor using another figure pattern.

Figure 13:
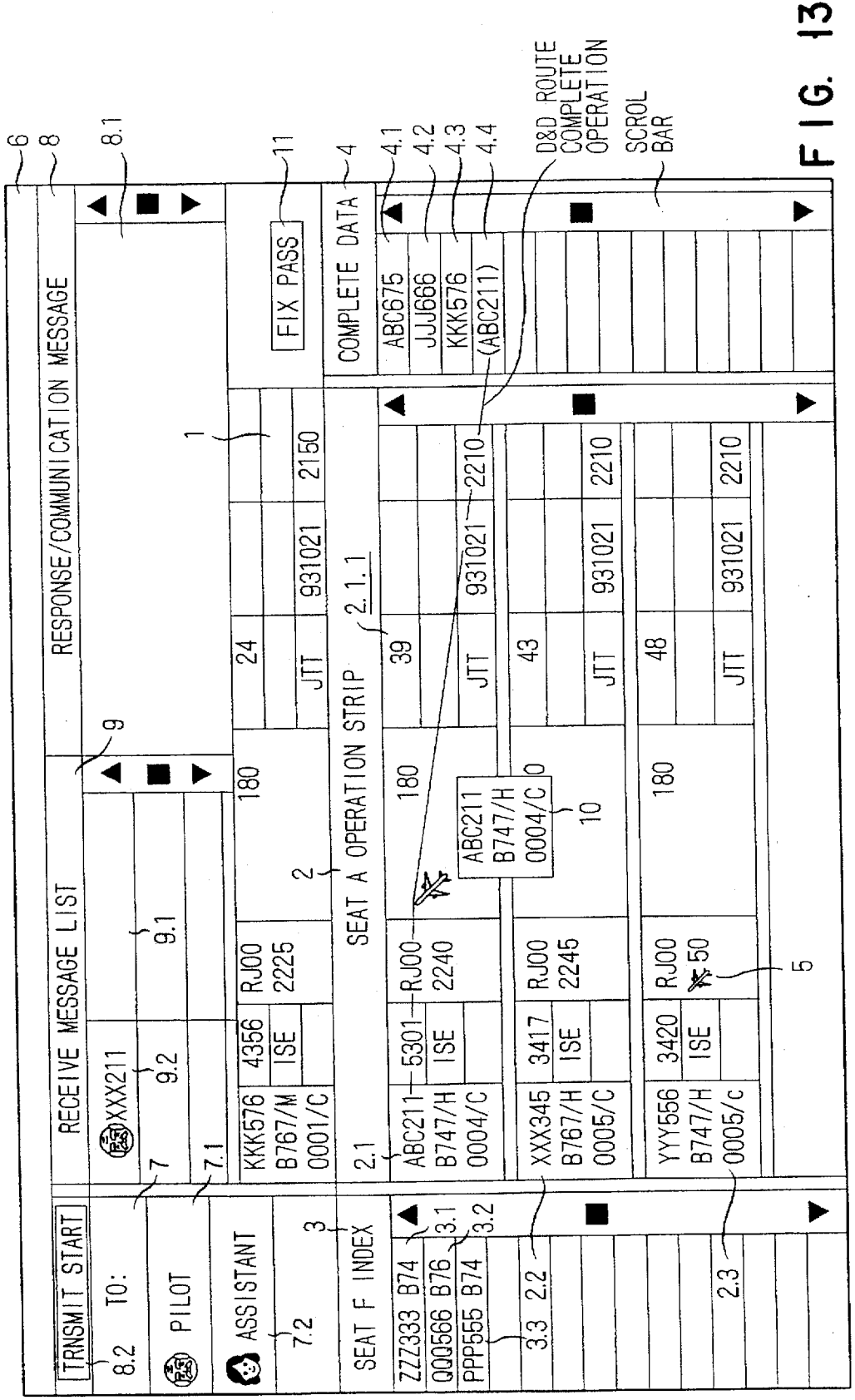
FIG. 13 shows an example of a display screen of a seat A of the embodiment.
Figure 14:
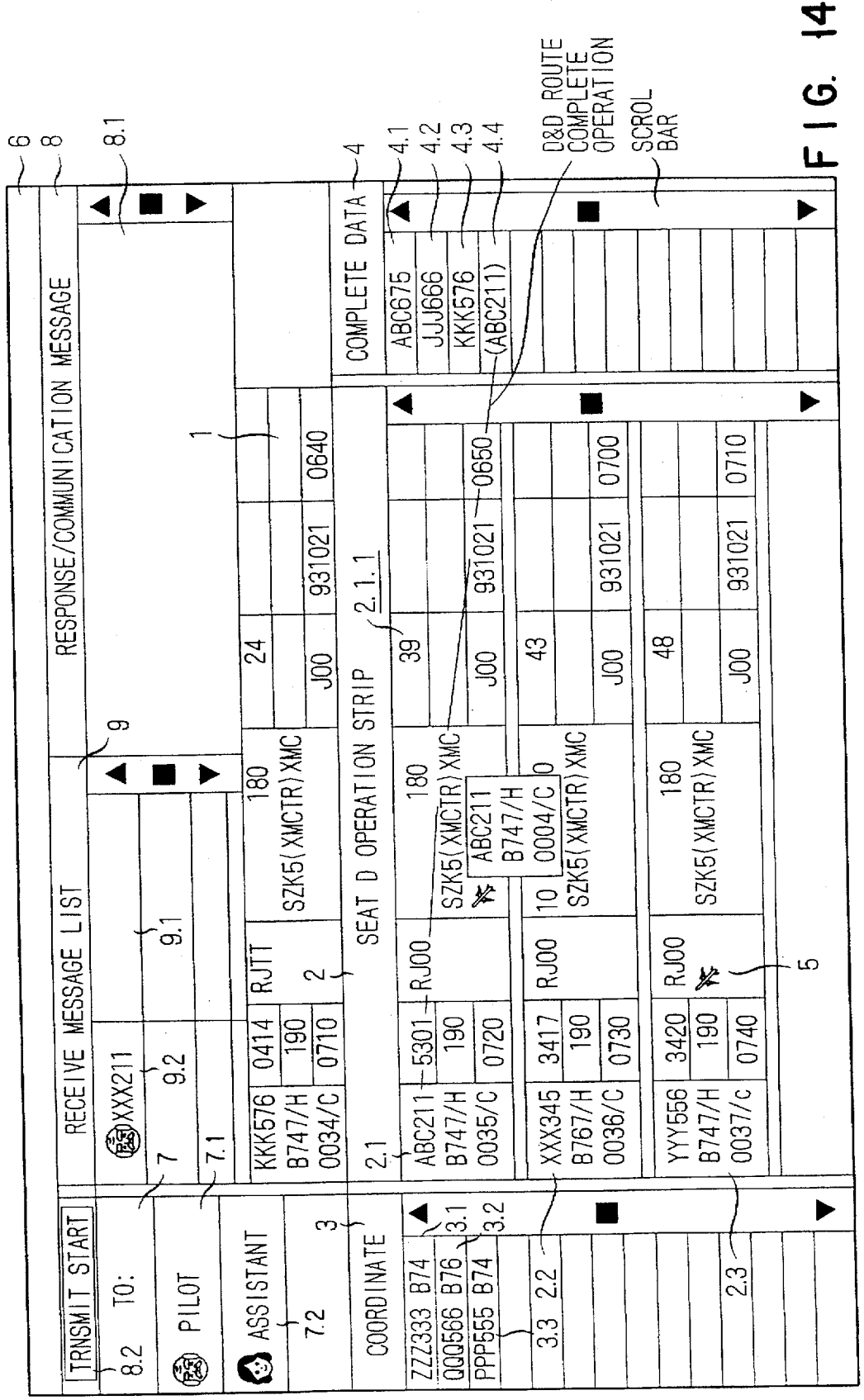
FIG. 14 shows an example of a display screen of a seat D of the embodiment.

In FIGS. 12 and 13, the entering FIX pass time shown in the region 2.2.1 is information determined and written by control processing. Further, in FIGS. 11 to 14, current circumferential information such as the time, direction of a wind, wind force, air temperature, and the likes is displayed in the region 6.

A reference numeral 7 denotes a region for specifying a target to which transmissions and inquiries are made by click operations using the mouse 11. A reference numeral 7.1 denotes a pilot specify region, and a reference 7.2 denotes an assistant specify region.

A reference numeral 8 denotes a region for displaying a response message, a transmit message, a receive message or the like. A reference numeral 9 denotes a region for displaying a list of receive messages, and a region 9.2 for displaying a roll of a transmit source with use of an icon and a name of a target when a message is received, and a region 9.1 for displaying top information of the received message.

For example, when an index list displayed in the receive message list display region 9 is specified by clicking the region 9.1 or 9.2 by a mouse 11, all the messages can be displayed in the response/communication message display region 8.1.

In the following, transfer processing from a coordinate seat to a seat F further to a seat A will be explained with reference to FIGS. 15A and 15B. Specifically, operations at each control seat will be explained with attention to an arrival airplane ABC211 entering along an entering route from the south, as shown in FIG. 19.

In general cases, operation strip control information is called a strip and includes items as shown in FIG. 15A.

In FIG. 15A, a reference (1) denotes a call name of an airplane, a reference (2) denotes a type/rear turbulence division, a reference (3) denotes information concerning computer identify numbers and SSR devices, a reference (4) denotes a secondary radar individual code, a reference (5) denotes an abbreviation of an entering auxiliary FIX, a reference (6) denotes a control accept limit point, a reference (7) denotes a place of destination, a reference (8) denotes an expected entering auxiliary FIX pass time, a reference (9) denotes an expected control accept limit point arrival time, a reference (10) denotes an expected altitude (or a time where a retry of entering is carried out or where a pilot cancels a instrument flight plan), a reference (11) denotes an abbreviation of a STAR (i.e., a standard arrival route) used, a reference (12) denotes a method of receiving transfer of services, a reference (13) denotes an entering FIX or an entering auxiliary FIX pass time, a reference (14) denotes an abbreviation of FIX where a stand-by route is used, a reference (15) denotes an expected arrival time (EAT) or an auxiliary notification item, a reference (16) denotes an entering permission issue time, and a reference (17) denotes an entering permission, a reference (18) denotes others, a reference (19) denotes a place of departure, a reference (20) denotes the year, month, and date when the computer edited the strip, and a reference (21) denotes a time when the computer edited the strip.

Subsequently, set values of transfer mode data M(i) and strip mode data S(i) in the present invention will be described below. In the following, i denotes a computer number of operation strip plan data. In "ABC211", i=0004 exists and M(i)=0 and S(i)=0 exist in a stage where the data is transferred to a coordinate seat from an operation plan data storage section 26.

At first, the system is started in a method of turning on a server A, clients B1, B2, and B3 in this order. Then, control of the system is shifted to a window display control section 143, and an initial screen (e.g., operation strip data of each window shown in FIGS. 11 to 14, a fixed display screen except for airplanes, and the like) stored in the window display content storage section 142 is displayed.

Figure 11:
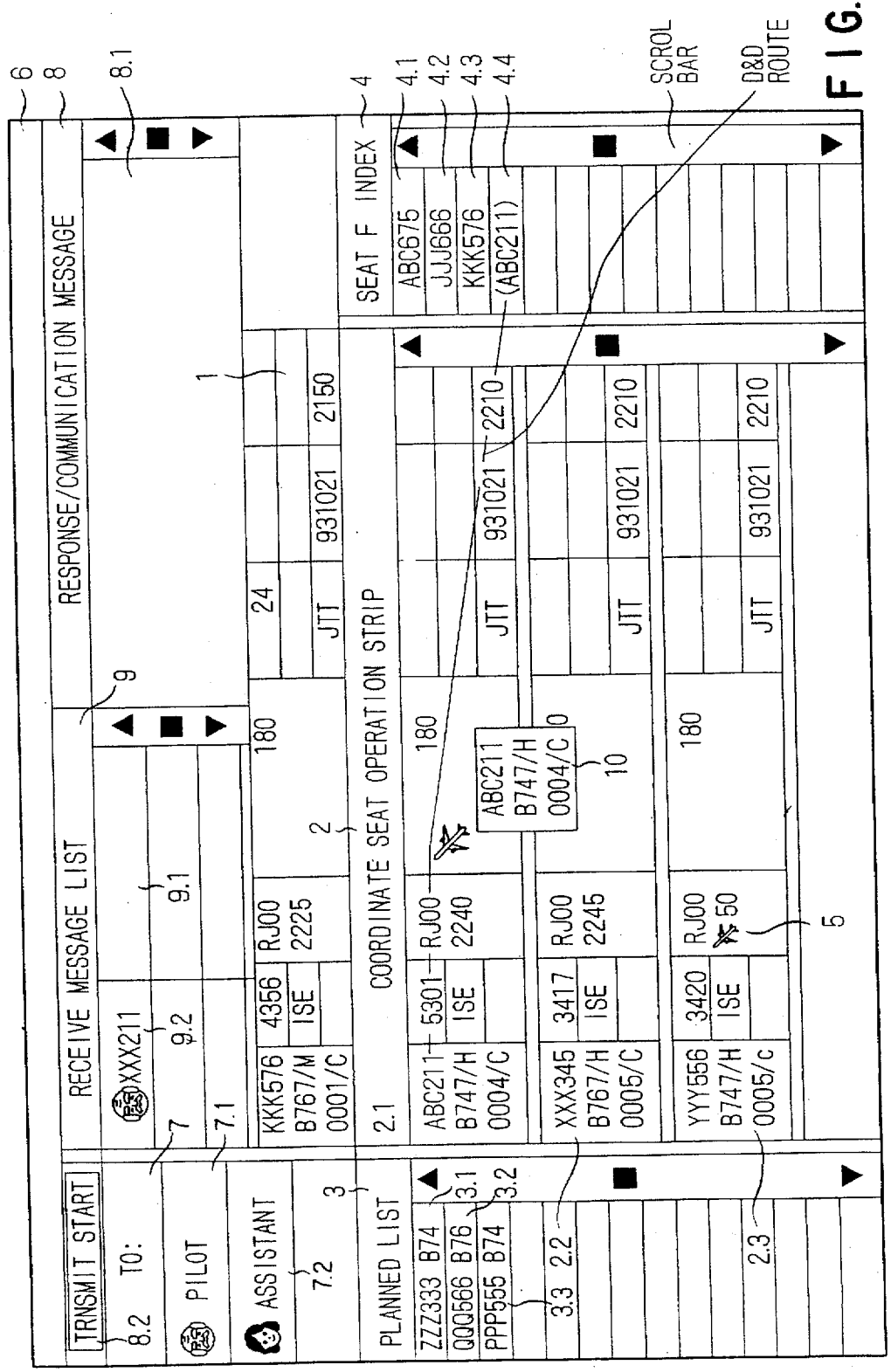
FIG. 11 shows an example of a display screen of an adjustment seat of the embodiment.

In the server (or coordinate seat) A, an operation strip data register section 37 is started by the window display control before a predetermined time, and index information (e.g., flight names of airplanes in this embodiment) of operation strip plan data set in a data format shown in FIG. 10 is added to the initial screen, in regions 3.1 to 3.3 of a plan list display window 3, as shown in FIG. 11.

In the following, explanation will be made along the flow of the processing stated above.

(STEP 1)

In the server A, a predetermined time preceding operation strip data register section 37 reads current time information from a timer 47, and simultaneously reads operation strip data of airplanes preceding their expected entering times (e.g., reference (15) in FIG. 10) in operation strip control data by thirty or more minutes, from an operation strip plan data storage section 26. The data is written into an operation strip control data storage region 381.

In the following, explanation will be made to steps in which an operation strip is transferred from a server (or coordinate seat) A to clients (e.g., seats F and A), supposing screens of FIGS. 11 to 13.

As shown in FIG. 11, it is supposed that data shown in regions 2.1 to 2.3 as regions 2.1 to 2.3 is registered in the coordinate seat through processing by the predetermined time preceding operation strip data register section 37, that data displayed in regions 3.1 to 3.3 of a plan list display window 3 is registered into an operation strip plan data storage section 26, and that data of the seat F displayed in regions 4.1 to 4.3 of a transfer destination window 4 is registered in a seat F operation strip control data storage region 382.

In this time point, data of the coordinate seat and the seat F is sent to a client B1 of the seat F through a communication processing section 36. In the client B1 of the seat F, index information is written into a coordinate seat data storage region 381 in an operation strip control data storage section 38, and all the transferred information of the seat F is written into a seat F data storage region 382, thereby displaying operation strip control information in form of FIG. 12. In the client B2 of the seat F, index information of other control seats is written into the operation strip control data storage section 38, through the same communication processing as stated above, and operation strip control information is displayed in a format shown in FIG. 13.

Since the flight ABC211 has a number of i=0004, two kinds of the mode data of this flight are respectively expressed as M(4) and S(4).

At first, operation at a server (or coordinate seat) A will be explained.

Whether or not values have been inputted into all the items (1) to (11) in FIG. 1 is checked, and then, each of M(4) and S(4) is set to 1.

(STEP 2)

In FIG. 11, when the region 2.1 is dragged and dropped into the region 4.4, menu display items of the drag source and the drop destination are transmitted to the menu specify detect section 132. In the menu specify detect section 132, the values of transfer mode data M(4) and strip mode data S(4) are checked along a check flow stored in the operation strip transfer data storage section 33, in accordance with check data stored in the storage section 33. If there is transfer which cannot be permitted by the check, the drag and drop operation is neglected and the following processing is not carried out.

In this example, the transfer source is the coordinate seat itself, and an equation of M(4)=1 exists. Therefore, a transfer operation is permitted since the value "1" corresponding to the value "1" of the M(4) shown in FIG. 9B is equal to the value of the current S(4), and the value "2" corresponding to the value "1" of M(4) shown in FIG. 9A is equal to the value "2" of the control seat number of the transfer operation destination. Then, transfer processing is carried out.

When the drag detect section 125 detects completion of the operation, the detect result is transmitted to the mouse cursor display control section 127, regardless of whether or not a drag & drop operation is permitted. Therefore, the D&D icon 10 disappears from the screen by transfer to the mouse cursor display control section 127 from the menu specify detect section 132.

When confirmation is made as to the fact that the control seat number of a transfer destination and the operation strip control data are prepared and a transfer operation is permitted, the menu items of the drag source and the drag destination are stored into the drag source/drop destination item storage section 133. This information is sent to the operation strip control information update section 19 through the processing determination 134.

Next, explanation will be made to an operation where transfer processing is carried out between a server A of the coordinate seat and a client B1 of the seat F.

The operation strip control information update section 19 of the coordinate seat as a server A transmits data contents of the coordinate seat for a flight ABC211 having a computer number of 0004 together with mode data, to the control seat for the client B1 through the communication processing section 36. The client B1 of the seat F receives the contents and the data, writes them into the operation strip control data storage region 382, and erases index data of the flight ABC211 of the coordinate seat.

Upon completion of this processing, the transfer mode data M(4) is updated to "2", and the updated mode data and normal completion of writing thereof are notified to the server A through the communication processing section 36.

(Step 3)

The client of the seat F makes a request to the operation strip display data generate section 16 of the display data generate section 16, for data of the seat F to be displayed in the region 2.1 shown in FIG. 12, and simultaneously, erases display of index data of the coordinate seat which has been displayed in the window 3.

Note that FIG. 12 display only the results of transfer, but does not a index of the coordinate seat as the transfer source. In addition, display of the seat F does not indicate a display screen immediately after transfer, but a display screen after the regions 2.2 and 2.3 are registered.

Meanwhile, when the server A of the coordinate seat receives updated mode data from the client B1 of the seat F and normal completion of updating thereof through the communication processing section 36, the operation strip control information update section 19 writes data contents of the coordinate seat concerning the flight ABC211 having a computer number of 0004 stored in the operation strip control data storage section 38 of the coordinate seat, into the seat F operation strip control data storage region 382. Then, the data of the coordinate seat stored in the coordinate seat operation strip control data storage region 381 is erased, and the mode data is updated. Subsequently, the display data generate section 16 erases data of the coordinate seat which has been displayed in the region 2.1 shown in FIG. 11, and displays instead the data of the coordinate seat in the seat F index display region 4.4 in the window 4 of the transfer destination.

Further, the server A of the coordinate seat transmits transfer completion data from the coordinate seat to the seat F, together with index data and mode data, with respect to the flight ABC211 having the computer number of 0004, through the communication processing section 36 to the client B2 of the seat A. When the updated mode data and the completion data of transfer from the coordinate seat to the seat F is received from the server A, the operation strip control information update section 19 of the client B2 of the seat A writes contents of transfer data of the flight ABC211 having the computer number of 0004 into the operation strip control data storage region 382, erases the data of the coordinate seat, and updates the mode data in accordance with the receive data. In this state, the client B2 of the seat A displays information transferred through the display data generate section 16 to the seat F index display region shown in FIG. 13.

In the following, explanation will be made to an operation where the above transfer processing steps are visualized at the transfer destination.

In the server A, when a drag operation is started with respect to the operation strip display region (i.e., the window 2 in FIG. 11) of the coordinate seat and the D&D icon 10 has entered into adjacent regions of a predetermined range (e.g., a region of ¼ in size) the coordinate seat display region close to the seat F display region, the drag operation from the coordinate seat display region to the seat F display region and the information concerning mouse coordinates are transmitted to the client B1 of the seat F.

The client B1 of the seat F receives the information from the server A is received by the communication, and sends the receive information to the display data generate section 16. In the display data generate section 16, the drag display data generate section 166 displays the drag condition in form of a visual indication (which is called "a transfer icon") as shown in FIG. 16 by the reference numeral 10.

In this case, adjacent regions of a predetermined range (e.g., a region of ¼) adjacent to the seat F display region of the coordinate seat display region in the server A is proportionally divided in the longitudinal and lateral directions, thereby specifying the transfer icon 10, and the display position of this transfer icon 10 is calculated and displayed through mapping processing.

When a drag is transferred to the seat F index display region 4, this transfer is notified to the client B1 of the seat F through the communication processing 36, like the above case. Simultaneously, in the client B1 of the seat F, the transfer icon shifts to the seat F operation strip display region 382 in the drag display data generate section 166. In the lateral direction of the screen, mapping is performed with respect to a corresponding information position (i.e., the position of the flight name region of the flight ABC211 or the like), thereby to display the transfer icon. The processing after a drop operation is the same as that stated above.

The following explanation will be made to an operation in the client B1 of the seat F in the next step. FIG. 19 shows an example of a distributed range of entering control with use of a terminal radar.

In the control seat of the seat F, when a controller identifies an airplane passing an entering FIX point from the south and clicks a FIX pass time button displayed in the region 11 of FIG. 12 while monitoring a terminal radar, minute-based information "39" of the entering FIX pass time is displayed in the region 2.1.1 of FIG. 12, as shown in FIG. 15B, and the strip mode data S(4) is updated to "2", through processing by the mouse input processing section 12, the click operation item detect section 131, the processing determine section 134, the operation strip control information update section 19, and the operation strip display data generate section 164 of the display data generate section 16.

Simultaneously, the operation strip data and the mode data concerning the flight ABC211 added with entering FIX pass time data are sent to the server A. Next, operations in the server (coordinate seat) A and other clients B2 and B3 will be explained in the following.

When the operation strip data and mode data concerning the flight ABC211 added with entering FIX pass time data are received by the server A through the communication processing section 36 shown in FIG. 2, the received data is sent to the operation strip control information update section 19, and the data stored in the operation strip control data storage region 382 and the data stored in the mode data storage section 43 are updated.

Further, the server A performs transmission of the mode data through the communication processing section 36, in relation to the client B2 of the seat F. In response to this transmission, the client B2 of the seat A updates the mode data of its own control seat.

(Step 4)

By the same operation as in the step 2, transfer processing of the operation strip information from the seat F to the seat A is performed, and the transfer mode M(4) is set to 3.

The next operation in the client B2 (of the seat A) will be explained below.

(Step 5)

By the same operation as in the step 3, the strip of the transferred flight ABC211 is displayed, and the strip mode S(4) is set to 3.

(Step 6)

By the same operation as in the step 2, the operation strip information of the seat A is transferred to the completion data display region 4 through a D&D operation. As a result of this, the data of the seat A which has been stored in the seat A data storage region 383 is transferred to the completion data storage section 44.

Therefore, according to the embodiment having the structure as stated above, it is possible to reduce loads to controllers with respect their circumferential recognitions and judgments as well as feed-back thereof to operators or related persons, to provide instructions more accurately and rapidly, and further to make communications between pilots and controllers not only by voice but also by visual measures.

In the following, other embodiments of the present invention will be explained.

FIG. 17 shows an example of display at the seat F with use of a file holder method, as another embodiment of display of operation strip control information according to the present invention. In FIG. 17, reference numerals 21, 22, and 23 respectively denote a coordinate seat operation strip display window, a seat F operation strip display window, and a seat A operation strip display window, wherein only the indexes are displayed by the file holder method in the windows 21 and 23.

In addition, since the window 22 cannot display all the information, only the first line is displayed as a tag for each of operation strips (2.3 to 2.5) other than operation strips (22.1 and 22.2) to be dealt with. Further, with respect the seat F, all the information of a specified operation strip can be observed by clicking the tag.

In FIG. 17, a reference numeral 24 denotes a D&D icon.

FIG. 18 shows a window display screen which allows window display overlapping, as another embodiment of display of operation control information according to the present invention. Specifically, this figure shows a computer terminal screen for a seat F in a control system having two arrival seats corresponding to entering directions, e.g., an arrival south seat (as a seat A) and an arrival north seat (as a seat B).

In FIG. 18, a reference numeral 31 denotes a window for displaying operation strip information of the seat F to be dealt with. A reference numeral 32 denotes a window for displaying an operation strip information index of the seat A. A reference numeral 33 denotes a window for displaying an operation strip information index of the seat B. A reference numeral 34 denotes a window for displaying an operation information index of the coordinate seat as a source from which a request for control is made.

In the terminal seat F, when a mouse display cursor 35 is moved to, for example, a region 31.1 of the window 31 of the seat F and a mouse middle button 112 is pressed, an movable D&D icon 36 is displayed at a cursor position.

When the D&D icon 36 is moved to a region 32.4 of a seat A window 32 while pressing the middle button 112 and the button is then released, operation information of a region 31.1 of the seat F is transferred to the seat A, operation information of the region 31.1 of the seat F window 31 disappears, and an index of operation information of the seat F which has been displayed in the region 31.1 of the region in a region 2.4 of the window 32 is displayed.

Likewise, transfer from the seat F to the seat B can be performed in the same manner as stated above. In this case, it is possible to check whether an airplane enters from the south with respect to transfer to the seat A and whether an airplane enters from the north with respect to transfer to the seat B.

In addition, if two arrival seats of seats A and B are provided in FIG. 12 of the above embodiment, it is possible to provide a means which performs an automatic distribution to the seats A and B when an operation of transfer to an arrival seat (i.e., a representative one of the seats A and B) is made.

Further, although transferred operation strip control information is subjected to a check as to fulfillment of transfer information and transfer destinations and transfer is automatically made only through a judgment and an operation by a controller of a transfer source in the above embodiment, it is possible to provide a means which adds the operation strip control information to existing operation strip control information through a confirmation operation from a transfer destination. In this case, it is much more effective to provide a means which allows a controller of the destination to make a selection as to denial and suspension of the operation strip control information, in addition to acceptance of receipt of the information.

For example, when denial is selected, then control information remains in the transfer source and the system returns to a condition where transfer is performed. When suspension is selected, the information is stored in form of a different control condition in the transfer destination or the transfer source, and therefore, a new operation can be performed at the transfer source or the transfer destination. In this case, the transfer source may include a means for enabling an operation of switching transfer to another control seat or for making an action of issuing a request for acceptance of transfer or of making an inquiry to the transfer destination. The transfer destination may include a means for making a response such as receipt, denial, or continuous suspension of the transfer information, with respect to which suspension has been selected. Further, the transfer destination may include a means for specifying the position in the operation strip to which the information is transferred and added.

In the above embodiment, the transferred operation strip control information is subjected to a check as to fulfillment of transfer information and transfer destinations. If control data is insufficient, a lacking data item is displayed and then the display returns through a confirmation operation to a condition before the operation is performed. However, insufficient data may be displayed and transfer processing may be performed by a confirmation operation. Otherwise, transfer processing may be performed without a confirmation operation, and the displayed operation strip may be arranged such that insufficiency of the data items can be identified. In this case, it is possible to provide a means for allowing the transfer destination to select denial or suspend of receipt of the control data, in addition to acceptance thereof, when a confirmation operation is performed, as explained above.

In the above embodiment, a number of operation strips to be controlled are displayed on a screen as many as can be, displayed within a range, and the other operation strips are displayed by scrolling the screen. However, it is possible to provide a means for specifying a means for displaying a part or all of operation strip control information as index information and a means for specifying operation strip information from the index. In this case, if all the index information cannot be displayed, it is possible to provide a means for displaying the remaining index information by scrolling the screen.

The above embodiment has been explained with respect to a case where a transfer source, a related control seat, a transfer destination, or a storage destination of control completion data is displayed in form of a list menu or an index of control strip information to be controlled. However, it is possible to provide a means for displaying a part of these items as a transfer source control seat, a related control seat, or a transfer destination control seat, in the form of an icon or a figure in place of a congregation of separate operation information, and for performing transfer from a related operation strip control information list by specifying a transfer destination of control information.

In this case, it is possible to add a means for displaying contents of operation strip control information of a control seat displayed in the form of an icon or a figure, in response to an operation of clicking the icon or figure with a pointing device, so that contents to be displayed in the window 1 in FIGS. 11 to 14 can be referred to or that transfer operation based on a drag and drop operation can be performed like in the above embodiment.

In the above embodiment, transfer processing based on a drag and drop operation has been explained. However, it is possible to adopt a method of respectively clicking operation strip information to be controlled and operation strip information of a transfer destination, to specifying a transfer source and a transfer destination. Further, if the transfer destination can be fixed, it may be arranged such that specification of the transfer destination can be omitted.

In the above embodiment, when operation strip control information is transferred in the control seat of the transfer destination, the flight name of an airplane is displayed as a transfer icon, in order to visually clarify an operation process by which the control information is transferred from a transfer source to a transfer destination. However, any other display form may be adopted instead as far as such display form clearly shows that the transfer operation is performed with respect to a control seat of the transfer source.

In the above embodiment, specification of transfer information and a transfer destination, or a storage destination of control completion data, and movement of operation strip control information are performed by operating a mouse. The mouse may be replaced with any other means as far as such a means can be used as a pointing device such as a touch panel, a track ball, a pen interface or the like. In addition, it is possible to combine a cursor movement of a keyboard with such a means.

In the above embodiment, when a movement route specification using a pointing device is performed, top information of the operation strip information is used as a drag icon. However, this drag icon may be replaced with a symbolic icon, a figure, character information, or mark information which expresses all or a part of operation strip control information to be controlled.

In the above embodiment, transmit information is dragged and dropped to a transmit destination, and a specify input item for specifying a transmission start is displayed at the timing when the transmit data is displayed in a communication message display region. Further, transmission is started by then inputting specification of transmission. However, transmission may be started at the timing when the transmit information is dragged and dropped to the transmit destination or when the transmit information is displayed in the communication message. In this case, it is possible to provide a means for starting, stopping, or suspending transmission through a means for confirming whether or not the transmit information may be carried out.

In the above embodiment, an operation for clarifying that data is being transmitted or received is not performed. However, it is possible to provide a display means for making display such that a user can easily understand the current communication condition, by providing a means for visually identifying or clarifying that operation control information or text messages are being transferred, transmitted or received.

In the above embodiment, transmission of a part or all of information may be made in any form of spoken voice, voice synthesis, text communication, and multi-media communication, with use of spoken voice between control seats and pilots, including communication between the control seats each other.

In the above embodiment, the transmit destination of a receive message and the top data thereof are displayed as index information. However, a title expressing the receive message or key-information based on a result of interpreting the receive message may be displayed as an index.

In the above embodiment, a common display region is used for the transfer message display region, receive message display region, and transfer message input region. However, all or a part of these regions may be separated into a different region.

In the above embodiment, a controller directly communicates with or responds to pilots of airplanes, by conversation. However, communication may be made by synthesizing voices or transmitting text information, with use of a means for inputting information as a text and a means for making a selection or a change to messages of a fixed massage list previously prepared.

In the above embodiment, control seats of seats F, A, D, and B and a coordinate seat respectively correspond to different terminals. However, all or a part of functions of the plurality of control seats may be concentrated onto one terminal. Further, the number of control seats is not limited to three (i.e., seats F, A, and D) or four (i.e., seats F, A, D, and B), but may be changed if necessary, as far as each of the control seats has an equivalent functional responsibility.

Further, there may be a plurality of terminals having an equal function as a control seat. It is possible to provide a means for changing the terminal to be used for operation strip control among the plurality of terminals of control seats, in accordance with crowdedness of control services.

In the above embodiment, operation strip control information is displayed on a screen in a format imitating an operation strip which is conventionally used. However, any different format may be used as far as the format describes and shows information of the operation strip.

In the above embodiment, a coordinate seat and seats F, A, and D are respectively assigned to a server and three clients. It is, however, possible to provide a means which allows four or a plurality of terminals to switch their functions as a server and clients.

Further, in case of a specialized server, each of the terminals may include a means for independently performing control support processing, by providing all the control seats with an equal function and allowing them to communicate with each other in the form of a dispersed system. In this case, even when a terminal functions as a server, the server may be manually or automatically switched to another terminal when a condition such as an interruption is detected.

In the above embodiment, D&D information is transmitted by a server, as a method of visually showing the procedure of a drag and drop (D&D) operation on a screen of a transfer destination. However, this method may be replaced with another method which efficiently performs communication, e.g., use of a means for directly communicating with each control seat.

In the above embodiment, communication is performed by a server with respect to functions other than D&D operations. However, it is possible to use a means for deciding a communication route by direct or dynamic determination processing, without using a server.

In the above embodiment, a drag and drop operation is neglected where operation strips of one control seat are specified by the drag and drop operation. It is, however, possible to provide a means for determining this drag and drop operation as a change in orders of operations strips, and for inserting the operation strip of the drag source before or after the operation strip of the drop destination. Otherwise, it is possible to provide a means using a method of changing the orders of operation strips, which is different from the means stated above.

Although the above embodiment adopts a connection form of LAN shown in FIG. 1, it is possible to adopt a star-shaped connection form around a server as the center. Otherwise, the LAN may be constituted by a plurality of wirings such as doubled systems, in order to ensure a down-countermeasure.

In the above embodiment, specific examples of operations have been explained with respect to arrivals of airplanes. In case of a seat D for performing control of departures of airplanes, operation strip data is transferred by a D&D operation from a coordinate seat to the seat D. Then, control processing is performed in the seat D, and thereafter, is transferred to the completion data storage section 44 by a D&D operation, like the above.

The above embodiments deal with terminal control, a user interface apparatus for an operation strip control system for distributing control services for each of air-regions or airways, to make transferring control services, can be practiced in case of performing operation strip control in an en-route control system which takes over control of arriving airplanes and serves as a transfer destination of control of departing airplanes.

In addition, the present invention is not limited to the above embodiments, but can be variously modified into practical forms, without deriving from the scope of the present invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An air control supporting system for supporting air control services of a plurality of air control service staff members who carry out terminal radar control services and routing control services, previously distributed and related to each other, comprising:

a plurality of control seat terminal devices provided respectively for control seats of said plurality of control service staff members, each including an instruction input device for inputting an information request instruction for requesting information regarding an arbitrary airplane to be controlled, and an information transfer instruction for transferring information of an airplane, including information concerning a completed control service, to another seat, and an information display device for displaying said input information regarding said airplane to be controlled in a predetermined format;

information obtaining and managing means for obtaining necessary information for the control services of said plurality of control service staff members, one after another, for each airplane to be controlled, so as to form a database of information regarding each airplane to be controlled;

time schedule management means for managing a time schedule for each airplane to be controlled;

information processing means for reading out necessary information of corresponding airplanes to be controlled, from the information obtaining and managing means on the basis of a time schedule managed by said time schedule management means, and for reading out the information of a designated airplane when there is an information request instruction or an information transfer instruction from any one of said plurality of instruction input device, so as to edit the information in a predetermined format as a control service strip information; and information output means for outputting the control service strip information on the basis of the time schedule obtained by said information processing means, to information display devices of associated ones of said plurality of control service terminal devices, outputting the control service strip information on the basis of the information request instruction to the information display device of the control seat terminal device via which that information request instruction was input, and outputting control service strip information on the basis of the information transfer instruction to the information display device of a designed control seat terminal device, and deleting the control service information of the corresponding airplanes to be controlled from the information display device of the control seat terminal device from which the information transfer instruction was input.

2. A system according to claim 1, wherein:

the information output means includes index display means for displaying at least a portion of the operation strip control information items, as index information; and the information processing means includes information transfer means for transferring and processing an instructed operation strip control information item, when one of the operation strip control information items displayed as the index information is instructed as a transfer information item to be transferred.

3. A system according to claim 1, wherein the information output means further includes operation route display means for visually displaying an operation route, through which an operation strip control information item is transferred to a control seat of a transfer destination from a control seat of a transfer source, in the control seat of the transfer destination, when an operation strip control information item is transferred by the information processing means.

4. A system according to claim 1, wherein the information output means further includes warning message display means for displaying unfilled information items in the control seat as the transfer source, together with a warning message, when a check is made in the control seat as the transfer source as to whether or not operation strip control information items fulfill those information items to be received by the transfer destination and if an instruction stating that the operation strip control information items cannot be received is made through the instruction input device.

5. A system according to claim 1, wherein:

the information obtain means further includes receive message obtain means for obtaining transmitted and received message information items between airplanes and the control seats;

the information output means includes message display means for displaying the transmitted and received message information items between the airplanes and control seats, index list display means for displaying at least a portion of the received messages in form of a list of index type, and menu display means for displaying transfer a destination in form a of a menu; and the information output means further includes transmit means for transmitting a specified message information item to a specified transmit destination, when an index is specified among the list and a transmit destination is simultaneously specified among the menu, by the instruction input device.

6. A system according to claim 5, wherein the information output means includes elapsed time display means for enabling visual identification and clarification that an operation strip control information item or a message is being transferred, transmitted or received.

7. A system according to claim 5, wherein:

the received message obtain means includes voice message input means for inputting a voice message of a pilot sent from an airplane to a control seat and a voice message of a controller from the control seat to the airplane, voice recognize means for recognizing the inputted voice obtained by the voice message input means, received message storage means for converting a recognition result obtained by the means into a text and for storing the text, and message interpret means for grasping contents of text messages stored in the received message storage means and for identifying and interpreting information of an item significant among the text messages; and the information processing means includes information update means for updating a response message and an operation strip control information item to be supplied to persons related to control, pilots, and the likes, on the basis of text information items interpreted by the message interpret means.

8. A system according to claim 5, wherein:

the information processing means includes a presumption means for reading a corresponding knowledge data item from knowledge data storage means previously storing knowledge data items used for making a presumption such as presentation of an optimal guide route or confirmation of a flight plan, in response to an advice request instruction, and for making a presumption based on the knowledge data thus read, when an advice request instruction for requiring a response to an inquiry from a pilot, a validity check concerning a confirmation matter, and a transmit message to a pilot is received from the instruction input device; and the information output means includes presumption result display means for displaying a presumption result of the presumption processing means.

9. A system according to claim 1, wherein the information obtain means and the information processing means each have at least a part of functions separated and provided for terminals of the plurality of control seats, such that the operation strip control information items are controlled by mutual communication between the terminals.

10. A system according to claim 1, wherein the information output means includes image display means for displaying at least a part of the operation strip control information items in form of an image like a book-strip or a file folder for each of units of airplanes to be controlled.

11. A system according to claim 1, wherein the control seats deal with control services of a feeder seat, an arrival seat, and a departure seat, and a coordinate seat deals with coordinate services of distributing operation strips to the control seats.

12. A system according to claim 11, wherein the arrival seat is divided into a plurality of sub-arrival seats in correspondence with entering routes.

13. A system according to claim 12, comprising means for performing automatic transfer from the feeder seat to the plurality of sub-arrival seats in accordance with entering routes.

* * * * *